United States Patent
Lee et al.

(10) Patent No.: US 12,436,876 B2
(45) Date of Patent: Oct. 7, 2025

(54) MEMORY MANAGEMENT SYSTEM

(71) Applicant: NVIDIA Corporation, Santa Clara, CA (US)

(72) Inventors: Sean Lee, Kirkland, WA (US); Vinod Grover, Mercer Island, WA (US); James Clarkson, Tewkesbury (GB)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/279,884

(22) Filed: Feb. 19, 2019

(65) Prior Publication Data

US 2020/0264970 A1 Aug. 20, 2020

(51) Int. Cl.
*G06F 12/02* (2006.01)
*G06F 3/06* (2006.01)

(52) U.S. Cl.
CPC .......... *G06F 12/023* (2013.01); *G06F 3/0608* (2013.01); *G06F 3/0631* (2013.01); *G06F 3/067* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 6,453,403 B1 | 9/2002 | Czajkowski | |
| 6,831,652 B1 | 12/2004 | Orr | |
| 2006/0129753 A1* | 6/2006 | Hasbun | G11C 11/406 |
| | | | 711/104 |
| 2007/0011415 A1* | 1/2007 | Kaakani | G06F 12/0269 |
| | | | 711/170 |

(Continued)

FOREIGN PATENT DOCUMENTS

| | | |
|---|---|---|
| CN | 103034484 A | 4/2013 |
| CN | 103870242 A | 6/2014 |

(Continued)

OTHER PUBLICATIONS

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

Peterson et al., "Reducing overhead in the Uintah framework to support short-lived tasks on GPU-heterogeneous architectures," Proceedings of the 5th International Workshop on Domain-Specific Languages and High-Level Frameworks for High Performance Computing, Nov. 15, 2015, 8 pages.

(Continued)

*Primary Examiner* — Kyle Zhai
(74) *Attorney, Agent, or Firm* — Davis Wright Tremaine LLP

(57) ABSTRACT

A computer system manages the allocation of memory to an application program using a dependency tree. The dependency tree informs a memory manager of data inputs, data outputs, and intermediate values associated with execution of the application program. The memory manager allocates a single heap structure within a physical memory. Data associated with each node of the dependency tree is allocated to the heap structure so that data input values are allocated in a contiguous block, and intermediate values are allocated separately. In various examples, as execution of the application program proceeds, the separation of intermediate values from non-intermediate values within the heap reduces memory fragmentation providing improved performance of the computer system as a whole.

30 Claims, 14 Drawing Sheets

(56) References Cited

U.S. PATENT DOCUMENTS

| | | | | |
|---|---|---|---|---|
| 2008/0209156 | A1* | 8/2008 | Inoue | G06F 12/023 |
| | | | | 711/170 |
| 2009/0063594 | A1* | 3/2009 | DeVal | G06F 12/0253 |
| 2009/0254728 | A1* | 10/2009 | Kamensky | G06F 12/1027 |
| | | | | 711/170 |
| 2011/0016153 | A1* | 1/2011 | Atta | G06F 16/282 |
| | | | | 707/797 |
| 2016/0285970 | A1 | 9/2016 | Cai et al. | |
| 2017/0083343 | A1 | 3/2017 | Burger | |
| 2017/0083997 | A1* | 3/2017 | Gruber | G06T 11/40 |
| 2017/0148357 | A1* | 5/2017 | Kawai | H04L 9/085 |
| 2018/0088996 | A1 | 3/2018 | Rossi et al. | |
| 2018/0137049 | A1 | 5/2018 | Duffy et al. | |
| 2018/0150392 | A1* | 5/2018 | Booss | G06F 12/023 |
| 2018/0293164 | A1* | 10/2018 | Perez | G06F 9/45558 |
| 2021/0089285 | A1* | 3/2021 | Du | G06F 8/35 |

FOREIGN PATENT DOCUMENTS

| | | |
|---|---|---|
| WO | 0190899 A2 | 11/2001 |
| WO | 2007071607 A1 | 6/2007 |
| WO | 2017001900 A1 | 1/2017 |

OTHER PUBLICATIONS

International Search Report and Written Opinion mailed Jun. 9, 2020, Patent Application No. PCT/US2020/018667, 15 pages.
Office Action for United Kingdom Application No. GB2113309.5, mailed Nov. 29, 2022, 5 pages.
Combined Search and Examination Report for United Kingdom Application No. GB2307483.4, mailed Jun. 15, 2023, 4 pages.
Office Action for Chinese Application No. 202080015024.8, mailed Jan. 24, 2025, 21 pages.
Office Action for Chinese Application No. 202080015024.8, mailed Jul. 3, 2024, 20 pages.
Office Action for Chinese Application No. 202080015024.8, mailed Nov. 22, 2024, 19 pages.
Office Action for United Kingdom Application No. GB2307483.4, mailed Oct. 4, 2023, 3 pages.
Pipelining, "How Pipelining Works," retrieved from https://cs.stanford.edu/people/eroberts/courses/soco/projects/risc/pipelining/index.html, Jun. 13, 2022, 4 pages.
Stackoverflow, "What Happens with Nested Branches and Speculative Execution?," retrieved from https://stackoverflow.com/questions/59209662/what-happens-with-nested-branches-and-speculative-execution, Dec. 10, 2019, 5 pages.

* cited by examiner

```
public static PrimeCheck(int num) {
int temp;
boolean isPrime=true;
for(int i=2;i<=num/2;i++) {
    temp = GPU_Exec(num,i);   // 204
    if(temp==0) { isPrime=false; break;
    }
}
if(isPrime)
        System.out.println(num + " is a Prime Number");
else
        System.out.println(num + " is not a Prime Number");
}
```

200

CPU Context

- - - - - - - - - - - - - - - - - - - - - - - - - - - -

GPU Context

```
int public GPU_Exec(int num, int i) {
return(num%i);
}
```
206

MEMORY MANAGEMENT SYSTEM

BACKGROUND

In many computing systems, data is stored in addressable block memory. Data may include variables, strings, integers, floating-point numbers, or arbitrary data associated with a particular program, process, thread, procedure call or function. Some data may be static data, in that the duration of the data is persistent over the lifetime of the application to which it belongs. Other data may be transitory in nature. For example, a variable used within the body of a function may be created when the function is called and deleted when the function completes. In another example, a piece of data may be stored in a section of allocated memory by the application and then deleted when the application no longer needs the piece of data. The transitory nature of some application data generally results in memory being allocated to storage of the transitory data, and then deallocation of the same memory when the data is no longer needed. In a linear address space, this can produce a pattern of memory fragmentation where allocated parts of memory are interspersed with free parts of memory in a noncontiguous way.

This fragmentation can lead to problems when allocating memory for larger data objects. For example, if existing allocations in a memory are sufficiently fragmented, allocating memory to store a large data object may be impossible due to the lack of a single contiguous block sufficient to store the object, notwithstanding an aggregate amount of sufficient free memory. Therefore, devising ways to avoid memory fragmentation is an important problem that enhances the operation of computing systems.

BRIEF DESCRIPTION OF THE DRAWINGS

Various techniques will be described with reference to the drawings, in which:

FIG. 2 illustrates an example of a computer program where a portion of the computer program runs a graphics processing unit, in an embodiment;

DETAILED DESCRIPTION

Figure 1:
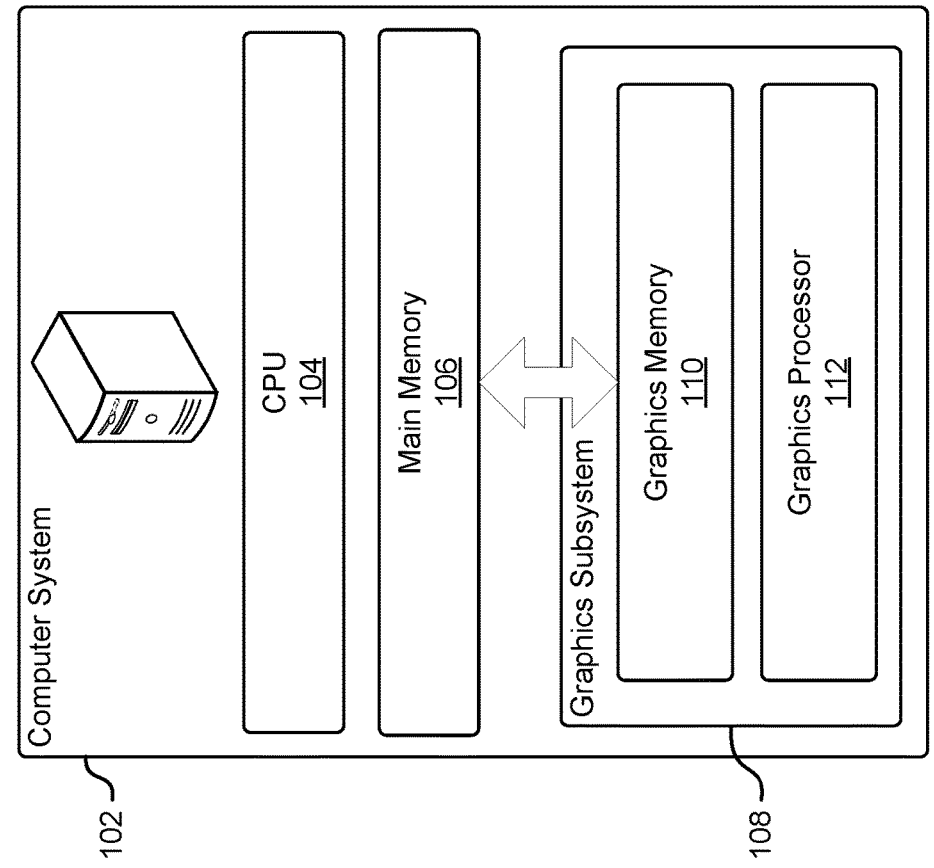
FIG. 1 illustrates an example of a computer system with a graphics processing unit, in an embodiment.

The present document describes a memory management scheme for a graphics processing unit ("GPU") of a computer system. In an embodiment, a computer system allocates memory within the graphics processing unit for use by a GPU-hosted program. In an embodiment, the computer system analyzes the GPU-hosted program to identify program inputs, outputs, and intermediate values used by the program by generating a tree structure where the leaf nodes of the tree structure represent input values used by the program, the root node of the tree structure represents the output of the program, and the intermediate nodes of the tree represent transient or temporary variables used by the program. In an embodiment, the GPU-hosted program can be an expression to be evaluated by the GPU, or a program written in a language that provides managed-memory functionality such as Java, Scala, Python, Haskell, or Pascal.

In an embodiment, the computer system allocates memory for the GPU-hosted program by making a single allocation of contiguous GPU memory, the size of which is determined base at least in part on the information in the tree structure. In an embodiment, the size of the memory allocation is determined by adding the size of the variables associated with each node of the tree structure. In an embodiment, the location of each program variable is determined by maintaining a table with a relative address of the respective variable respective to the start of the allocated memory block.

In an embodiment, program variables are assigned to locations within the relative block based at least in part on the predicted lifespan of each variable. In an embodiment, variables that are determined to be persistent throughout the life of the program are grouped together in a contiguous region of allocated memory on the CPU. In an embodiment, persistent variables include the inputs to the program which are represented by the leaf nodes of the tree structure. In an embodiment, the variables associated with the leaf nodes of the tree structure are allocated to a contiguous block of memory at the beginning of the allocated GPU memory block. In an embodiment, the root node of the tree structure represents the output of the program, and the output of the program is stored in memory in the contiguous block with the input variables. In an embodiment, the intermediate nodes of the tree structure represent transient values and variables used during the execution of the program. In an embodiment, variables and values represented by the interior nodes of the tree structure are allocated and deallocated in the remaining portion of the GPU memory block, and in general, are not required to be stored contiguously with the input or output values.

In an embodiment, the systems and methods described herein are used to provide efficient management of co-dependent memory regions. In various embodiments, the program is written in a computer language such as Java, Scala, Python, Haskell which relies on a runtime component that automatically allocates and deallocates memory space allocated to program variables without an express memory-management command in the source code. In an embodiment, this mechanism is extended to memory on a GPU by managing a separate area of memory which is physically separated and generally has less storage capacity. In an embodiment, these and other similar languages are implemented on a GPU using a technique which allows the computer system to integrate co-dependent memory regions transparently into an existing language which uses managed memory. In an embodiment, the solution exists in user-space and does not require modifications to the underlying programming language. In an embodiment, the technique allows the system to maintain memory regions on the GPU that are dependent on the primary memory regions on the central processing unit ("CPU"), where variables are automatically allocated and de-allocated. In an embodiment, this managed memory, can be used to implement support for programming languages, like Java, Python or Scala, on the GPU. However, other embodiments may be implemented on other types of devices or processors.

In an embodiment, the memory is part of a managed heap which is a region of continuous memory allocated to the program for use. In an embodiment, the program allocates memory from the heap to particular variables by assigning offsets relative to the start address of the heap to each variable. In an embodiment, the system resolves the location of a variable by adding the assigned offset of the variable to a base value (usually the start address of the heap) (base+offset addressing mode). In an embodiment, the assignment of variables to specific locations in the heap is tracked using a lookup table that allows the system to determine a mapping between a variable and the variable's allocated storage. In an embodiment, the program maintains a reference count which is used to determine which variables are still in use. In an embodiment, variables that are no longer in use are deallocated from memory. In an embodiment, through the use of relative addressing, the system is able to easily relocate memory allocations (program heaps) within a larger area of memory. In an embodiment, the total amount of allocated and/or unallocated memory in the heap is tracked.

In an embodiment, memory in the dependent memory regions are automatically de-allocated when the memory manager of the primary managed memory region de-allocates them. In an embodiment, if an allocation is requested that is too large to fit in the empty space remaining on the heap, the system runs a defragmentation algorithm that re-arranges valid allocations into a contiguous region—gathering multiple smaller free memory regions into a single larger contiguous region. The allocation can then proceed so long as the request will fit into the larger contiguous region.

In an embodiment, the system reduces memory fragmentation by managing memory allocations to fit into a predefined region. In an embodiment, a tree structure that represents dependencies between variables used in the program, or a computation graph is used to determine the variables used for an upcoming calculation. In an embodiment, since the amount of memory needed is calculated ahead of time, the system is able to accurately predict the size of the memory heap to be allocated. In an embodiment, this extra runtime information allows the system to determine whether the system is able to run a computation within the available memory. In an embodiment, if the computation is unable to be performed because the computation requires more memory than is available in the largest contiguous free memory block, but sufficient aggregate memory capacity is available, allocated memory may be relocated to assembly a contiguous block of sufficient size. In an embodiment, the system is able to determine a number of evictions sufficient to free up the required space. In an embodiment, evicted allocations can be stored in another memory area or saved to disk.

In an embodiment the system is able to fit multiple managed heaps into a single memory and ensure that the applications will not exceed the capacity of their respective heaps, thus making it possible to allocate memory for multiple applications into single addressable memory space and ensure that the applications will not interfere with each other's allocated region of memory. In an embodiment, as the memory requirement of each application is known before the application is run, and therefore the system is able to devise a memory-allocation scheme where a plurality of applications can be run in a single addressable space, and not interfere with each other.

In an embodiment, the use of a continuous memory region and relocatable addresses allows a managed heap to be used for a number of other uses such as taking a snapshot of the running application for saving program state. In an embodiment, this allows the system to recover from a known state in failed applications, migrate an application between physically different memories, or multiplex the execution of multiple GPU applications which together would require more memory than is physically available.

As one skilled in the art will appreciate in light of this disclosure, certain examples may be capable of achieving certain advantages, including some or all of the following: (1) precisely calculating upcoming memory requirements and the minimum number of memory evictions required, (2) eliminating extra GPU driver calls by pre-allocating a single contiguous region of memory. In an embodiment, this requires one cuMalloc and one cuFree for the lifetime of the application, (3) enabling allocations to be easily relocated through the use of base+offset addressing, (4) reducing fragmentation by introducing a garbage collection framework for dependent memory regions, (5) increasing the precision of memory allocation, and (6) providing a solution that can be implemented in user-space, with no access to the internals of the underlying virtual machine.

In an embodiment, the techniques described herein can be used to implement programming languages such as Java, Scala, Python and Haskell on GPUs, and enables applications to continue to work in the presence of memory fragmentation and to reduce the overhead incurred by repeated foreign function interface ("FFI") calls.

FIG. 1 illustrates an example of a computer system with a graphics processing unit, in an embodiment. FIG. 1 depicts, in an embodiment, an example 100 comprising a computer system 102 which can comprise a CPU 104, main memory 106, and graphics subsystem 108. In an embodiment, the computer system 102 is an operable entity comprising systems such as the graphics subsystem 108. In an embodiment, the computer system 102 can comprise one or more instances of a physical computing instance, such as a physical computer or device. Additionally, in an embodiment, the computer system 102 can include one or more processors, and memory storing instructions executable by the one or more processors. In an embodiment, the computer system 102 can comprise various components not depicted in FIG. 1, such as additional memory, hardware, processors, graphics subsystems, and/or variations thereof. Other variations are also considered as being within the scope of the present disclosure.

In an embodiment, the central processing unit 104 is any suitable processing device, such as one or more of a microprocessor, a co-processor, a micro-controller, a microcomputer, a central processing unit, a graphics processing unit, application specific integrated circuit ("ASIC"), custom reduced instruction set computing ("RISC") chip or some other programmable logic device. Examples of such processing devices include devices based on an Intel x86 architecture, an Itanium architecture, a reduced instruction set ("RISC") architecture (including ARM, Power Architecture and Blackfin architectures), and a SPARC architecture. In an embodiment, the CPU 104 operates by processing and executing program instructions as well as utilizing various data and data structures the main memory 106 can comprise.

The main memory 106, in an embodiment, is one or more data storage and/or memory, devices configured to operate, store, and process data for the CPU 104. The main memory 106, in an embodiment, can comprise one or more of the following components: random access memory ("RAM"), static random access memory ("SRAM"), dynamic random access memory ("DRAM"), and/or variations thereof. In an embodiment, portions of the main memory 106 can be mapped to one or more locations on the graphics subsystem 108, specifically the graphics memory 110, to be used in the processing and execution of various processes and/or applications.

In an embodiment, the graphics subsystem 108 is a graphics subsystem existing on the computer system 102 to provide processing capabilities, specifically the processing of graphics, although other processes can be performed by the graphics subsystem 108. In an embodiment, the graphics subsystem 108 can be an integrated graphics subsystem, which can exist in connection with the CPU 104. An integrated graphics subsystem, in an embodiment, is a graphics subsystem comprising memory shared with the CPU 104. In an embodiment, an integrated graphics subsystem shares various resources with the CPU 104 to perform and execute processes. In an alternative embodiment, the graphics subsystem 108 is a discrete graphics subsystem. A discrete graphics subsystem, in an embodiment, is a graphics subsystem comprising memory separate from memory utilized by the CPU 104. A discrete graphics subsystem, in an embodiment, utilizes an independent source of video memory and/or other memory types to perform and execute processes.

In an embodiment, the graphics subsystem 108 comprises graphics memory 110 which can be utilized by the graphics subsystem 108 to perform and execute various processes. The graphics memory 110, in an embodiment, is one or more data storage and/or memory devices configured to operate, store, and process data for the graphics processor 112. In an embodiment, the graphics memory 110 comprises one or more of the following components: variations of double data rate synchronous dynamic random-access memory ("DDR SDRAM"), variations of graphics double data rate synchronous dynamic random-access memory ("GDDR SDRAM"), high bandwidth memory ("IBM"), and/or variations thereof.

In an embodiment, the graphics processor 112, which in some examples can be denoted as a graphics processing unit ("GPU"), is any suitable processing device, such as one or more of a microprocessor, a co-processor, a micro-controller, a microcomputer, a central processing unit, a graphics processing unit, application specific integrated circuit ("ASIC"), custom reduced instruction set computing ("RISC") chip or some other programmable logic device. In an embodiment, the graphics processor 112 operates by utilizing various program instructions and data the graphics memory 110 and/or main memory 106 can comprise to perform various operations; these operations can comprise the generation of graphics, the processing of parallel operations, the processing of various deep learning techniques and networks; and/or variations thereof.

FIG. 2 illustrates an example of a computer program where a portion of the computer program runs a graphics processing unit, in an embodiment. FIG. 2, in an embodiment, depicts an example 200 of a computer program that can utilize both a CPU context as well as a. GPU context for execution. In an embodiment, the computer program 200 is written in the Java programming language. In an embodiment, the computer program 200 can be written in programming languages such as Java, Scala, Python, Haskell, and/or variations thereof.

In an embodiment, the computer program 200 is processed by a system, such as the computer system 102 described in connection with FIG. 1, into program instructions to be executed. In an embodiment, the program instructions the computer program 200 comprises can include instructions to determine which portions of the program instructions are run within a CPU context and/or a GPU context. In an embodiment, a CPU context refers to an environment provided by a CPU in which the execution of a program, such as the computer program 200, is run. Similarly, in an embodiment, a GPU context refers to an environment provided by a GPU in which the execution of a program, such as the computer program 206, is run.

The computer program 200, in an embodiment, comprises executable code that is executed in a GPU context. In an embodiment, the portion 204 of the computer program 200 denoted as "GPU_Exec(num,i);" corresponds to the computer program 206, which is executed within the GPU context 202. The execution of the portion 204, in an embodiment, can utilize a tree structure, such as the tree structure described in connection with FIG. 3. To determine the total amount of memory required, in an embodiment, the determined amount of memory can be allocated within the GPU context, and various memory management techniques such as memory reallocation and memory defragmentation can be utilized to execute the computer program 206.

In an embodiment, the execution of the computer program 200 begins with an allocation of a portion of memory within the CPU context corresponding to the memory requirements of the computer program 200. The computer program 200, in an embodiment, executes within the CPU context utilizing the CPU and main memory for the storage of program instructions as well as various input variables, output variables, and other intermediate variables as needed by the computer program 200. In an embodiment, the execution of the computer program 200 comprises the execution of the portion 204 corresponding to the computer program 206. The execution of the portion 204, in an embodiment, comprises an allocation of the total amount of memory required by the computer program 206 within the GPU context. In an embodiment, the memory allocated within the GPU context for the computer program 206, which in some examples can be denoted as a subroutine, can be referred to as a subroutine heap. In an embodiment, a contiguous block of memory is allocated within the GPU context to execute the computer program 206.

In various embodiments, the computer program 206 can be a subroutine, function, expression, script, executable graph, interpreted code, intermediate code, microcode, or executable instructions that are executable by a GPU, CPU, combinational logic state machine, or computer processor. Although a subroutine is illustrated and described as an example, additional embodiments with the above computer program types are also understood to be within the scope of the disclosure.

The execution of the computer program 206, in an embodiment, occurs within the GPU context 202. In an embodiment, the execution of the computer program 206 comprises utilizing the previously allocated block of memory to process and manage various facets of the computer program 206, such as program instructions, input variables, output variables, and other intermediate variables. In an embodiment, following the execution of the computer program 206, the computer program 200 resumes execution within the CPU context. In an embodiment, the computer program 200 comprises a loop structure in which the portion 204 is run numerous times. In an embodiment, each execution of the portion 204 comprises an allocation of memory as well as the utilization of various memory management techniques within the GPU context. In an embodiment, the execution of the portion 204 comprises the execution of the computer program 206 within the GPU context. In an embodiment, following the completion of the loop structure of the computer program 200, the computer program 200 can continue and finish execution within the CPU context.

In an embodiment, inputs and outputs of the computer program 206 are passed between memory of the CPU context and memory of the GPU context. The inputs and outputs, for example, may include parameters of the computer program 206 (int i), and return values (num % i) returned by the computer program 206. These input and output values, in an embodiment, are exchanged using an area of GPU memory mapped into a CPU addressable memory space.

Figure 3:
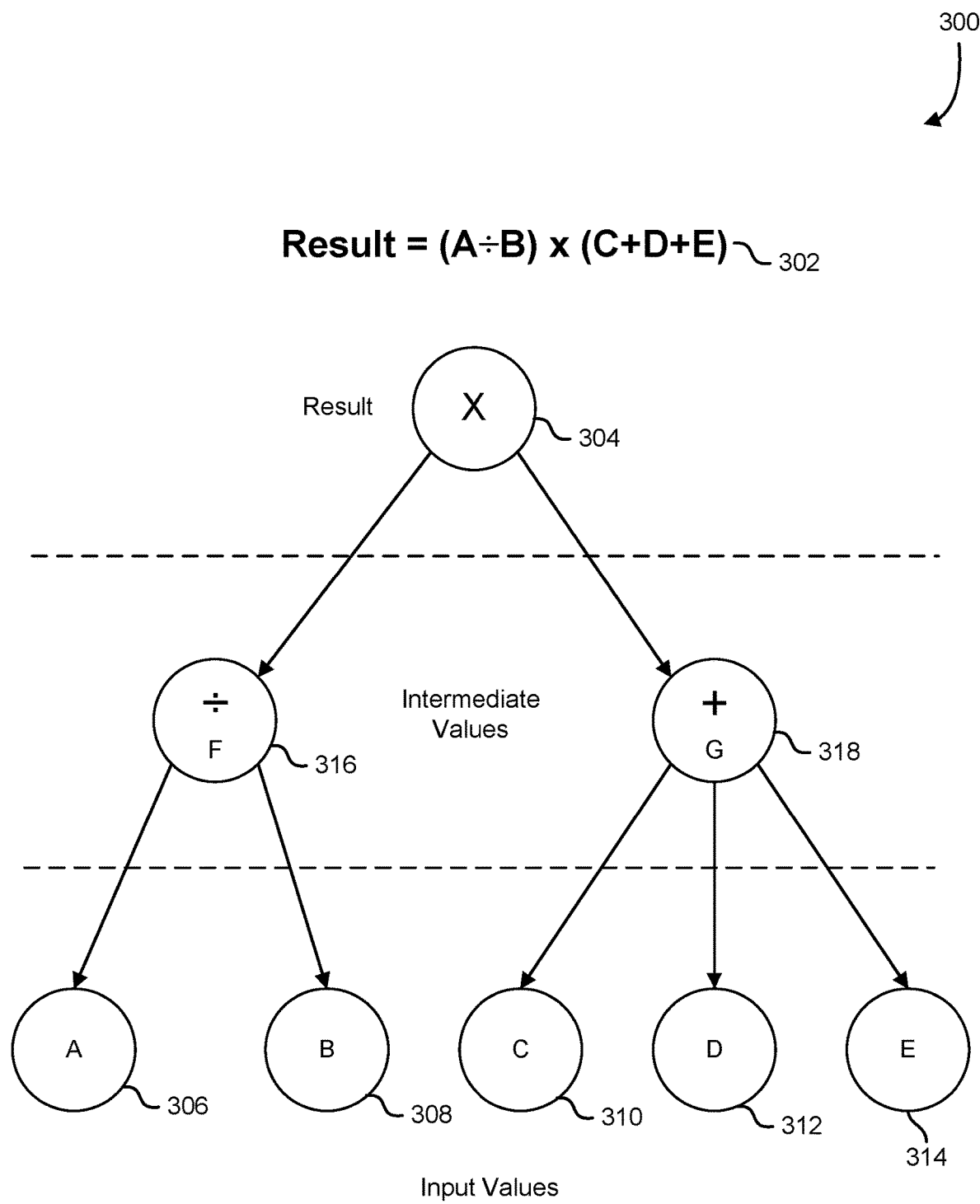
FIG. 3 illustrates an example of a tree structure that represents an expression capable of being evaluated on a graphics processing unit, in an embodiment.

FIG. 3 illustrates an example of a tree structure that represents an expression capable of being evaluated on a graphics processing unit, in an embodiment. FIG. 3, in an embodiment, depicts an example 300 of a tree structure that is generated by a computer system, such as the computer system 102 described in connection with FIG. 1, to determine the memory allocation requirements for a GPU-hosted program. In an embodiment, a GPU-hosted program can be a program like the computer program 206 running within the GPU context 202 as described in connection with FIG.

In an embodiment, the expression 302 is performed by a GPU-hosted program. In an embodiment, a system analyzes the GPU-hosted program to determine the inputs, outputs and intermediate values produced by the program, which correspond to the nodes of the tree structure. The expression 302, in an embodiment, can be written as a part of a computer program, and can utilize programming languages such as Java, Scala, Python, Haskell, and/or variations thereof. In an embodiment, the expression 302 is specified using additional identifiers and/or other forms of data to be evaluated within a GPU context as part of the GPU-hosted program. The expression 302, in an embodiment, is analyzed by the system to determine input variables, output variables, and intermediate value variables. In an embodiment, the node 304 (root node) represents the output variable(s).

In an embodiment, the node 304 is determined through an analysis of the expression 302. In an embodiment, the node 304 represents the result and/or output of the expression 302. In an embodiment, the result and/or output of the expression 302 is analyzed to determine the size required for the node 304. In an embodiment, the size of node 304 is determined by analyzing various facets of the result and/or output of the expression 302, such as variable types, computational logic, and/or variations thereof. In an embodiment, node 306, node 308, node 310, node 312, and node 314 are determined through an analysis of the expression 302. In an embodiment, the nodes 306, 308, 310, 312, and 314 represent the input variables to the expression 302. In an embodiment, the expression 302 comprises input variables "A," "B," "C," "D," and "E" and comprises the output variable "Result." In an embodiment, the input variables "A," "B," "C," "D," and "E" are analyzed within the context of the expression 302 to determine the sizes required for each individual node of the nodes 306-314.

In an embodiment, intermediate value variable nodes 316 and 318 are determined through an analysis of the expression 302. In an embodiment, intermediate value variable nodes 316 and 318 represent the intermediate value variables of the expression 302. In an embodiment, the intermediate value variables of the expression 302 represent variables that are separate from the input and output variables of the expression 302. In an embodiment, intermediate value variables can refer to variables that are not persistent throughout the life of a computer program, or expression such as the expression 302. In an embodiment, node 316 represents the intermediate value variable of the expression "(A÷B)" and node 318 represents the intermediate value variable of the expression "(C+D+E)."

In an embodiment, the total size of the tree structure determines the total memory allocated within GPU memory by the system for the GPU-hosted program, which performs the expression 302. In an embodiment, the total size of the tree structure is determined by a summation of the sizes of each individual node of the tree structure. In an embodiment, the size of each node in the tree is determined based at least in part on the type of the value represented by the node. In an embodiment, the system allocates the calculated total memory required for the GPU-hosted program by allocating a single block of contiguous GPU memory corresponding to the total memory required. The allocated GPU memory, in an embodiment, can be mapped to a portion of main memory existing on the system. Furthermore, in an embodiment, the input variables and output variables are allocated to a single contiguous block in the beginning of the allocated block of contiguous GPU memory In an embodiment, the intermediate value variables are allocated after the allocated input variables and output variables.

In an embodiment, the usage of the memory allocated for the intermediate value variables can depend on the state of the execution of the GPU-hosted program. For example, in an embodiment, intermediate value variables can be created and deleted depending on the state of the computer program or expression. In an embodiment, the state of the intermediate value variables corresponding to the nodes 316 and 318 depends on if the operations on the input variables have been executed as part of the expression 302. In an embodiment, if the operations on the input variables have not yet been performed as part of the expression 302, the intermediate value variables corresponding to node 316 and/or 318 can have null values in the allocated memory until the operations on the input variables have been performed, and the results of the operations on the input variables have determined the values of the intermediate value variables corresponding to nodes 316 and 318. For example, in an embodiment, before the execution of the expression "(C+D+E)" as part of the expression 302, the intermediate value variable corresponding to node 318 can have a null value, and following the execution of the expression "(C+D+E)", the intermediate value variable corresponding to node 318 in the allocated GPU memory can comprise the result of the executed expression. In an embodiment, following the execution of the expression "(A÷B)×(C+D+E)," the intermediate value variables corresponding to nodes 316 and 318 can be deleted after the result of the expression has determined the value of the output variable corresponding to the node 304.

The allocated block within GPU memory, in an embodiment, is utilized to perform the GPU-hosted program comprising the expression 302. In an embodiment, the allocated block within GPU memory comprises memory required for all of the variables required to execute the GPU-hosted program comprising the expression 302. In an embodiment, the input and output variables are of fixed sizes, while the intermediate value variables can vary in size and state depending on the state of the execution of the GPU-hosted program.

Figure 4:
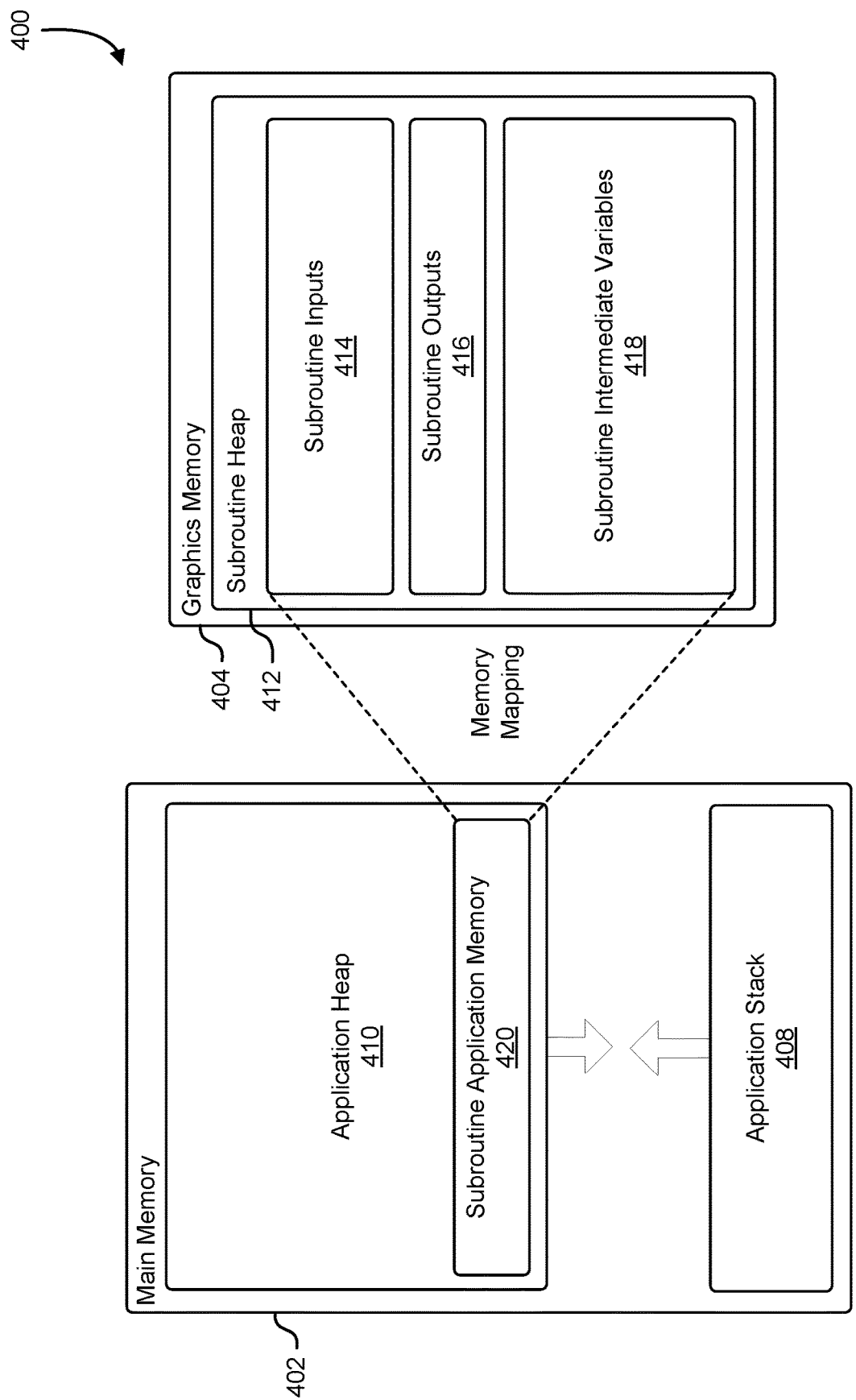
FIG. 4 illustrates an example of a mapping between main memory and graphics memory for a computer program, in an embodiment.

FIG. 4 illustrates an example of a mapping between main memory and graphics memory for a computer program, in an embodiment. FIG. 4, in an embodiment, depicts an example 400 of a main memory 402 and graphics memory 404, which a system, such as the computer system 102 described in connection with FIG. 1, can comprise. In an embodiment, the main memory 402 is one or more data storage and/or memory devices configured to operate, store, and process data for a processing unit, such as a CPU, and the main memory 402 can comprise various data structures, such as an application heap 410 and application stack 408. The main memory 402, in an embodiment, can comprise one or more of the following components: RAM (random access memory), SRAM (static random access memory), DRAM (dynamic random access memory), and/or variations thereof, and can be utilized to store program instructions that a processing unit can execute.

In an embodiment, the application heap 410 is a region of continuous memory that is allocated for the execution of a computer program, which in some examples can be denoted as an application. In an embodiment, the application heap 410 is determined based on the total memory requirements of a computer program. The application heap 410, in an embodiment, can comprise various input, output, and intermediate variables, as well as other data types and structures that a computer program can utilize throughout the life of its execution. Additionally, in an embodiment, the application heap 410 can comprise multiple heaps for usage by various subroutines and/or portions of the computer program. For example, in an embodiment, a computer program can comprise multiple subroutines that are run in a CPU context and multiple subroutines that are run in a GPU context. In an embodiment, the subroutines in separate contexts have their own associated individual heaps, which are denoted as subroutine heaps.

The application stack 408, in an embodiment, is a region of memory that is allocated for the execution of a computer program, which in some examples can be denoted as an application. In an embodiment, the application stack 408 can comprise various input, output, and intermediate variables, as well as other data types and structures that a computer program can utilize throughout the life of its execution. Additionally, in an embodiment, the application stack 408 can store variables local to the execution of a computer program, as well as other data and/or data structures that can be utilized in the execution of various functions a computer program can comprise. In an embodiment, the application stack 408 and application heap 410 are utilized together in the execution of a computer program. In an embodiment, memory on the application stack 408 can be allocated quicker than memory on the application heap 410, resulting in the application stack 408 being utilized for data and/or data structures that require lower latency allocation/retrieval.

The graphics memory 404, in an embodiment, is memory that is utilized by a graphics subsystem to perform and execute various processes. The graphics memory 404, in an embodiment, is one or more data storage and/or memory devices configured to operate, store, and process data for the graphics processor a graphics subsystem can comprise. In an embodiment, the graphics memory 404 can comprise one or more of the following components: variations of DDR SDRAM (double data rate synchronous dynamic random-access memory), variations of GDDR SDRAM (graphics double data rate synchronous dynamic random-access memory), HBM (high bandwidth memory), and/or variations thereof.

In an embodiment, the subroutine heap 412 is a heap structure that comprises a memory mapping of the subroutine application memory 420. In an embodiment, the subroutine application memory 420 is a portion of the application heap 410 that is allocated for the execution of a subroutine. In an embodiment the subroutine can execute on a graphics subsystem comprising the graphics memory 404. Furthermore, in an embodiment, the subroutine application memory 420 is memory required for the execution of a subroutine a computer program can comprise. In an embodiment, the subroutine application memory 420 is mapped to an allocated region of memory, denoted as the subroutine heap 412, on the graphics memory 404. In an embodiment, the computer program 200 comprises a subroutine 206 that is executed within a GPU context where the subroutine 206 utilizes the subroutine application memory 420 mapped to the subroutine heap 412.

In an embodiment, the subroutine heap 412 comprises subroutine inputs 414, subroutine outputs 416, and subroutine intermediate variables 418 that are utilized by a subroutine executing on a graphics subsystem that comprises the graphics memory 404. In an embodiment, the subroutine inputs 414, subroutine outputs 416, and subroutine intermediate variables 418 are variables that are determined to be required for the execution of the subroutine. In an embodiment, a subroutine is a portion of a computer program such as a function or set of instructions that is executed at the direction of another portion of the program. In an embodiment, the subroutine depicted in FIG. 4 is a portion of a computer program that is executed within a GPU context. In an embodiment, the memory allocated for the subroutine inputs 414, subroutine outputs 416, and subroutine intermediate variables 418 is determined with a tree structure such as the tree structure described in connection with FIG. 3. In an embodiment, the total memory required for the subroutine inputs 414, subroutine outputs 416, and subroutine intermediate variables 418 is allocated as part of the allocation of the subroutine heap 412. In an embodiment, the subroutine is analyzed to determine the total memory required for the subroutine inputs 414, subroutine outputs 416, and subroutine intermediate variables 418. In an embodiment, the total memory required is then allocated as the subroutine application memory 420, which is mapped to an allocation of the graphics memory 404, as the subroutine heap 412. Moreover, in an embodiment, the subroutine inputs 414, subroutine outputs 416, and subroutine intermediate variables 418 that the subroutine heap 412 comprises are utilized in the execution of the subroutine within a GPU context, which can be a graphics subsystem comprising the graphics memory 404.

Figure 5:
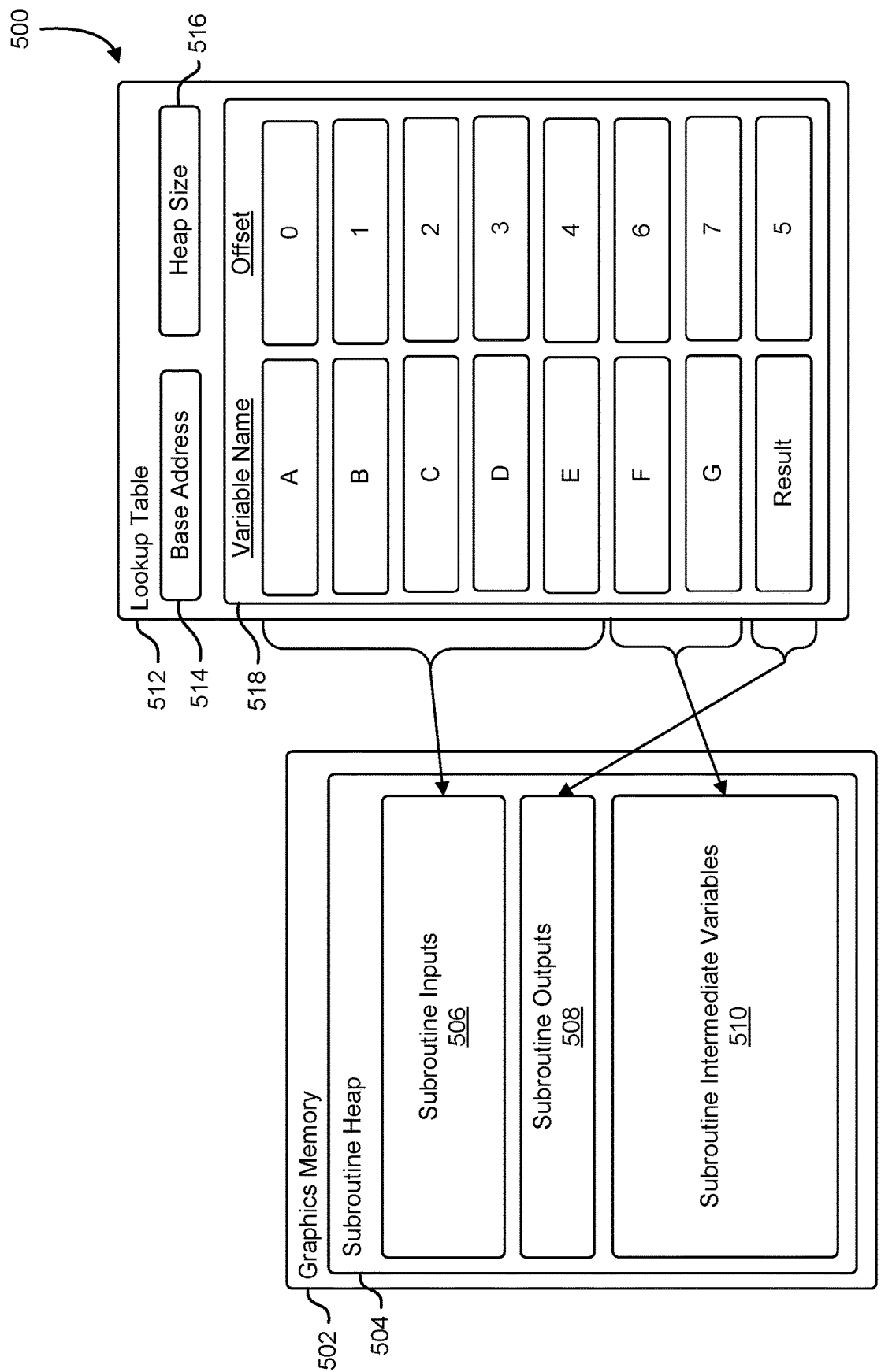
FIG. 5 illustrates an example of a lookup table that maps individual program data to memory locations within a region of graphics memory, in an embodiment.

FIG. 5 illustrates an example of a lookup table that maps individual program data to memory locations within a region of graphics memory, in an embodiment. FIG. 5, in an embodiment, depicts an example 500 of the structure of a memory location, specifically the subroutine heap 504, which utilizes the lookup table 512. In an embodiment, the lookup table 512 is maintained by a program running on a GPU, and the table maps locations in the heap to particular variables (input, output, and intermittent) used by the program. In an embodiment, the table stores a base address of the GPU heap, and an offset relative to the start of the heap for each variable. In an embodiment, this allows for efficient relocation of the GPU heap if necessary. In an embodiment, graphics memory 502 is memory that is utilized by a graphics subsystem to perform and execute various processes. The graphics memory 502, in an embodiment, is one or more data storage and/or memory devices configured to operate, store, and process data for the graphics processor a graphics subsystem can comprise. Additionally, in an embodiment, the graphics memory 502 can be a part of a graphics subsystem that a computer system, such as the computer system 102 described in connection with FIG. 1, can comprise.

In an embodiment, the graphics memory 502 comprises the subroutine heap 504. In an embodiment, the subroutine heap 504 is an allocated region of memory that a subroutine, which has been designated to execute within a GPU context, utilizes throughout the life of its execution. In an embodiment, the subroutine can be analyzed to determine the subroutine inputs 506, subroutine outputs 508, and subroutine intermediate variables 510 that the subroutine will utilize for its execution. In an embodiment, the subroutine inputs 506, subroutine outputs 508, and subroutine intermediate variables 510 are determined through a tree structure, such as the tree structure described in connection with FIG. 3. In an embodiment, the total memory required for the subroutine inputs 506, subroutine outputs 508, and subroutine intermediate variables 510 is determined with the aforementioned tree structure, and allocated within the graphics memory 502 to facilitate the execution of the subroutine within the GPU context.

In an embodiment, the subroutine inputs 506, subroutine outputs 508, and subroutine intermediate variables 510 are organized utilizing the lookup table 512. In an embodiment, within the subroutine heap 504, the subroutine inputs 506 are stored first, subroutine outputs 508 are stored next in a contiguous block along with the subroutine inputs 506, and subroutine intermediate variables 510 are stored last. In an embodiment, the organization of the subroutine inputs 506, subroutine outputs 508, and subroutine intermediate variables 510 is tracked utilizing the base address 514, heap size 516, and offset table 518. In an embodiment, the base address 514 is the address in the graphics memory 502 of the first subroutine input of the subroutine inputs 506. In an embodiment, the base address 514 refers to the first, or base, address of the allocated memory of the subroutine heap 504 comprising the subroutine inputs 506, subroutine outputs 508, and subroutine intermediate variables 510. In an embodiment, the heap size 516 is the total size of the subroutine heap 504 comprising the subroutine inputs 506, subroutine outputs 508, and subroutine intermediate variables 510.

In an embodiment, the lookup table 512 comprises the offset table 518 to track the locations of the subroutine inputs 506, subroutine outputs 508, and subroutine intermediate variables 510 within the subroutine heap 504 relative to the base address 514. In an embodiment, the lookup table 512 is stored within the graphics memory 502 to manage the subroutine inputs 506, subroutine outputs 508, and subroutine intermediate variables 510 the subroutine heap 504 comprises. In an embodiment, the lookup table 512 utilizes the offset table 518 to track the subroutine inputs 506, subroutine outputs 508, and subroutine intermediate variables 510 by storing the base address 514, where the first subroutine input of the subroutine inputs 506 is stored, and storing offsets from the base address 514. In an embodiment, the offsets are utilized to track the location of the other subroutine inputs 506, subroutine outputs 508, and subroutine intermediate variables 510 relative to the first subroutine input located at the base address 514. For example, in an embodiment, subroutine input A can be stored at the base address corresponding to an offset of 0. Correspondingly, subroutine input B, which is stored immediately after subroutine input B, can have its location tracked relative to subroutine input A, with an offset of 1. In an embodiment, all of the locations of the subroutine inputs 506, subroutine outputs 508, and subroutine intermediate variables 510 are tracked relative to the base address 514, where the first subroutine input is stored.

In an embodiment, the base address 514 and offset table 518 utilized by the lookup table 512 allows the subroutine heap 504 to be shifted without significant additional computation, as the locations are not tracked with absolute addresses within the graphics memory 502, but rather with relative addresses relative to the base address 514. For example, in an embodiment, if another subroutine heap is introduced to the graphics memory 502, the existing subroutine heap can be shifted to another base address. In an embodiment, the base address of the lookup table corresponding to the shifted subroutine heap is updated to continue to track the shifted subroutine heap. In an embodiment, the subroutine inputs, subroutine outputs, and subroutine intermediate variables do not change because they are addressed relative to the base address. Additionally, in an embodiment, the subroutine heap 504 is capable of being relocated as a result of a memory defragmentation operation. In an embodiment, multiple subroutine heaps can be allocated within the graphics memory 502. In an embodiment, multiple allocations and deallocations can cause memory fragmentation in which portions or fragments of allocated memory, due to their small size, comprise unusable free memory. In an embodiment, the lookup table 512 can be utilized to relocate and/or reorganize multiple subroutine heaps to reduce the fragmentation caused by the multiple subroutine heaps.

Figure 6:
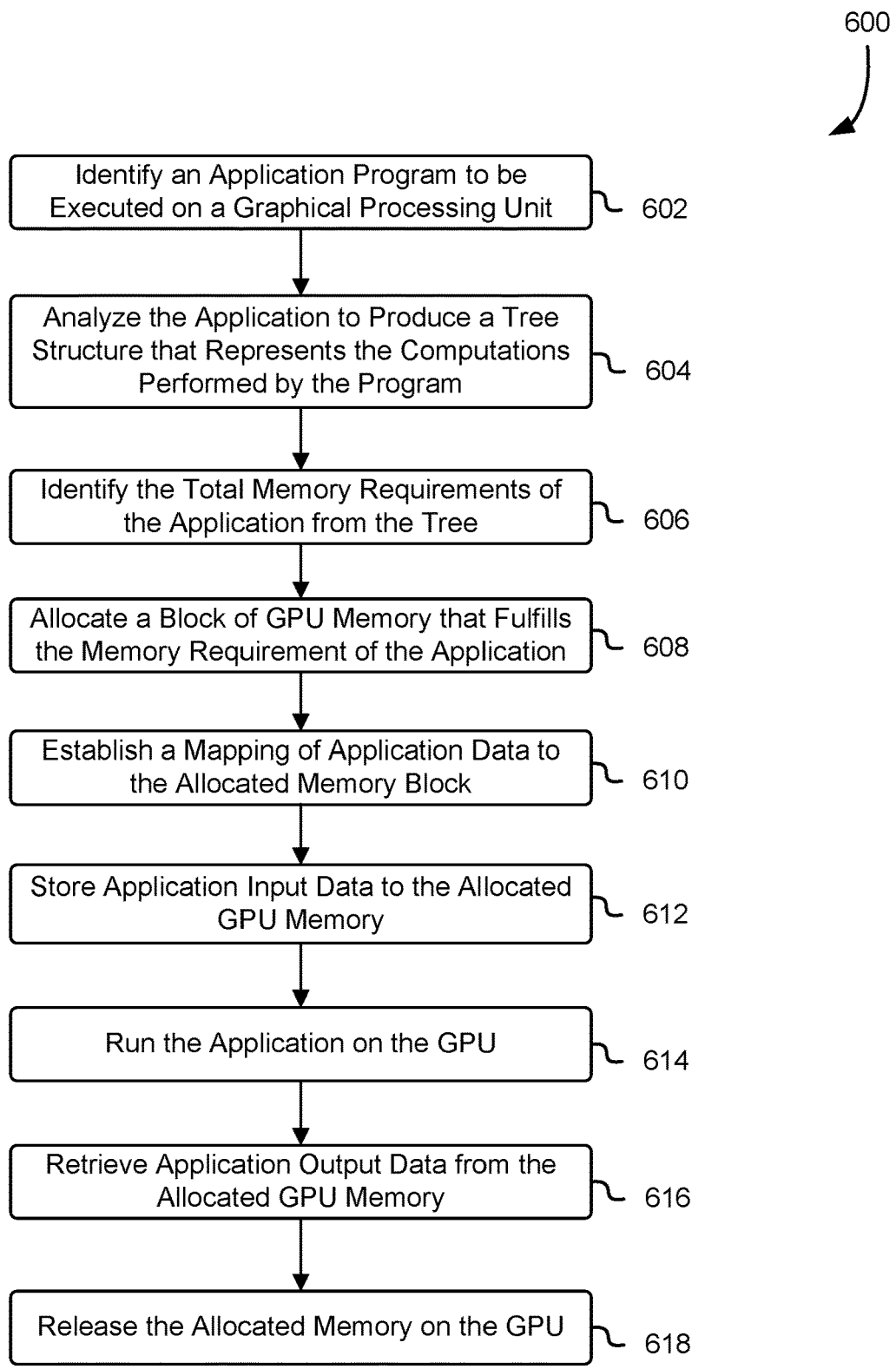
FIG. 6 illustrates an example of a process that, as a result of being performed by a computer system, allocates graphics memory within a graphical processing unit for use by an application program, in an embodiment.

FIG. 6 illustrates an example of a process that, as a result of being performed by a computer system, allocates graphics memory within a graphical processing unit for use by an application program, in an embodiment. In an embodiment, the system performing the process 600 identifies 602 an application program to be executed on a graphical processing unit (GPU). In an embodiment, an application program can comprise various identifiers within the program, such as specific syntax within the application program to denote that the application program is to be executed on a graphical processing unit. Additionally, in an embodiment, an application program can comprise other various forms of identification, such as metadata or other identifiers indicating the execution on a graphical processing unit. Furthermore, in an embodiment, an application program can be executed from one or more specific computer applications on a computer system, which can direct the execution of the application program to a graphical processing unit.

In an embodiment, the system performing the process 600 analyzes 604 the application to produce a tree structure that represents the computations performed by the program. In an embodiment, the system analyzes the application by producing a tree structure such as the tree structure described in connection with FIG. 3. In an embodiment, the tree structure comprises nodes that comprise the input variables, output variables, and intermediate value variables. Further information regarding generation of the tree structure can be found in the description of FIG. 3.

In an embodiment, the system performing the process 600 identifies 606 the total memory requirements of the application from the tree. In an embodiment, the system identifies the total memory requirements of the application by a summation of the sizes of the nodes of the produced tree structure. In an embodiment, the nodes of the tree structure correspond to the input variables, output variables, and intermediate value variables that the application utilizes throughout the life of its execution.

In an embodiment, the system performing the process 600 allocates 608 a block of GPU memory that fulfills the memory requirement of the application. In an embodiment, the allocated block of GPU memory corresponds to the total memory requirements of the application, which can be determined from the tree structure. In an embodiment, the system performing the process 600 establishes 610 a mapping of application data to the allocated memory block. In an embodiment, the mapping of the allocated memory block comprises the input variables and output variables in a contiguous block in the beginning of the allocated memory block, and the intermediate value variables in a block after the aforementioned contiguous block. Further information regarding the mapping of the allocated memory block can be found in the description of FIG. 4 and FIG. 5.

In an embodiment, the system performing the process 600 stores 612 application input data to the allocated GPU memory. In an embodiment, the application input data corresponds to the input variables determined as part of the tree structure. In an embodiment, the application input data is stored in the portion of the allocated memory block of GPU memory mapped to the application input variables, which can be in a contiguous block in the beginning of the allocated block of GPU memory.

In an embodiment, the system performing the process 600 runs 614 the application on the GPU. In an embodiment, the system runs the application on the GPU by executing the necessary processes to direct the execution of the application on the GPU. In an embodiment, the application can be executed on the GPU by utilizing the allocated block of GPU memory for various data and/or data structures. In an embodiment, the various data and/or data structures the allocated block of GPU memory comprises are utilized throughout the execution of the application.

In an embodiment, the system performing the process 600 retrieves 616 application output data from the allocated GPU memory. In an embodiment, the execution of the application on the GPU comprises the generation of output data. In an embodiment, the output data is stored in the allocated block of GPU memory in a contiguous block along with the input data. In an embodiment, the output data can be retrieved directly from the allocated block of GPU memory. In an embodiment, the system performing the process 600 releases 618 the allocated memory on the GPU. In an embodiment, the allocated memory on the GPU is de-allocated, allowing for further allocations for subsequent application programs to be executed on the GPU.

Figure 7:
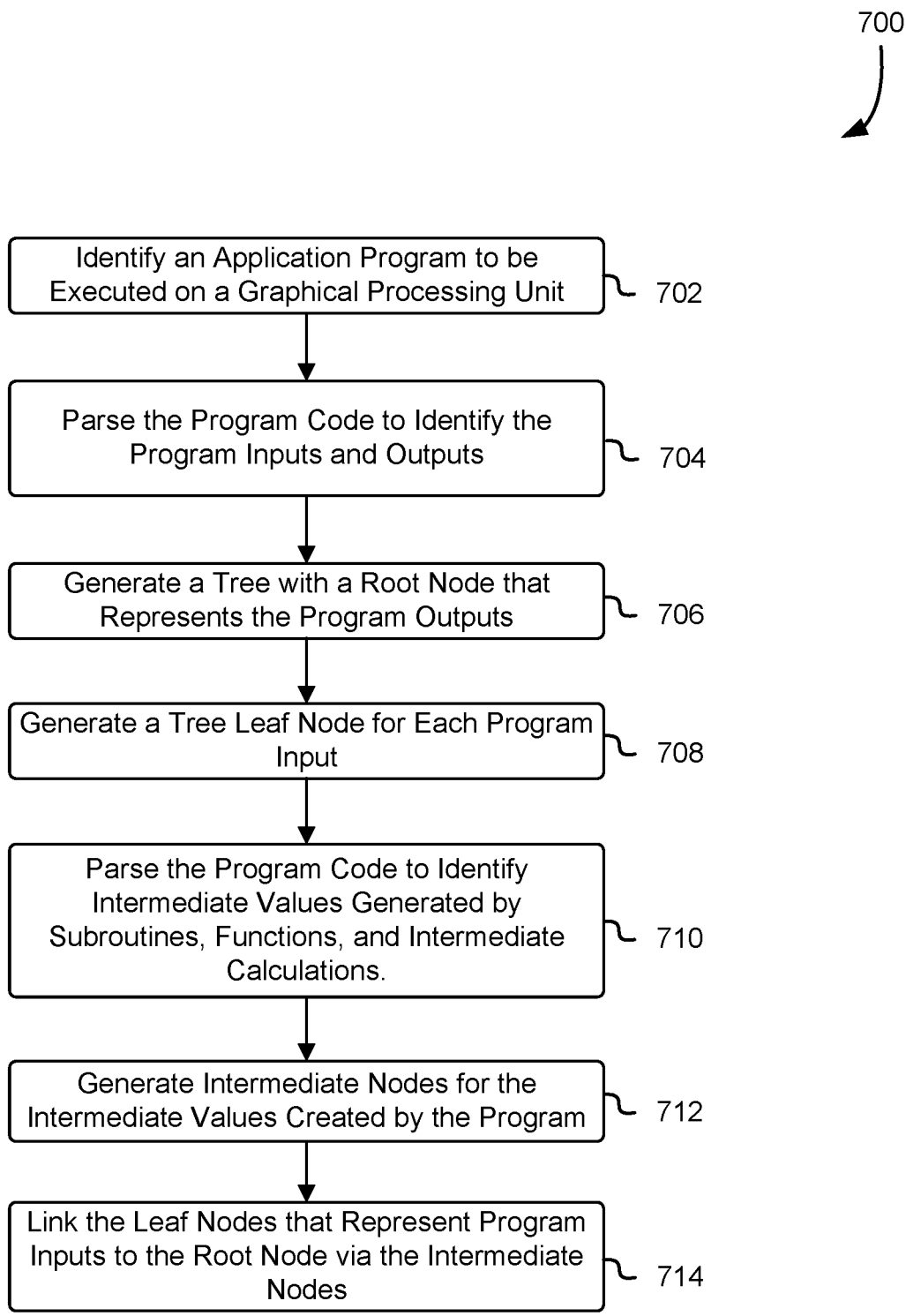
FIG. 7 illustrates an example of a process that, as a result of being performed by a computer system, generates a tree representing the relationships between data used by a computer program, in an embodiment.

FIG. 7 illustrates an example of a process that, as a result of being performed by a computer system, generates a tree representing the relationships between data used by a computer program, in an embodiment. In an embodiment, the system performing the process 700 identifies 702 an application program to be executed on a graphical processing unit (GPU). In an embodiment, an application program can comprise various identifiers within the program, such as specific syntax within the application program to denote that the application program is to be executed on a graphical processing unit. Additionally, in an embodiment, an application program can comprise other various forms of identification, such as metadata or other identifiers indicating the execution on a graphical processing unit. Furthermore, in an embodiment, an application program can be executed from one or more specific computer applications on a computer system, which can direct the execution of the application program to a graphical processing unit.

In an embodiment, the system performing the process 700 parses 704 the program code to identify the program inputs and outputs. In an embodiment, the system parses the program code by analyzing the syntax and/or semantics of the program code to determine the program inputs and outputs. In an embodiment, the system analyzes the program code by identifying various keywords, structures, and/or variations thereof the program code comprises to determine the program inputs and outputs. In an embodiment, the determination of the program inputs and outputs can comprise further determining various characteristics of the program inputs and outputs, such as variable type, size, usage, and/or variations thereof.

In an embodiment, the system performing the process 700 generates 706 a tree with a root node that represents the program outputs. In an embodiment, the root node that represents the program outputs is determined by the system parsing the program code. In an embodiment, the root node represents the program outputs and comprises various characteristics of the program outputs. In an embodiment, the root node comprises an indication of the size of the program output. In an embodiment, the program can comprise multiple sets of program outputs, in which multiple root nodes and tree structures can be generated.

In an embodiment, the system performing the process 700 generates 708 a tree leaf node for each program input. In an embodiment, the leaf nodes that represent the program inputs are determined by the system parsing the program code. In an embodiment, a leaf node represents a program input, and comprises various characteristics of the program input. In an embodiment, the leaf node comprises an indication of the size of the program input. In an embodiment, the program can comprise multiple inputs, in which multiple leaf nodes can be generated with respect to a root node within a tree structure.

In an embodiment, the system performing the process 700 parses 710 the program code to identify intermediate values generated by subroutines, functions, and intermediate calculations. In an embodiment, the system can parse the program code by analyzing the syntax and/or semantics of the program code to determine the program intermediate values. In an embodiment, the system analyzes the program code by identifying various keywords, structures, and/or variations thereof the program code comprises to determine the program intermediate values. In an embodiment, the determination of the program intermediate values can further comprise determining various characteristics of the program intermediate values, such as variable type, size, usage, and/or variations thereof.

In an embodiment, the system performing the process 700 generates 712 intermediate nodes for the intermediate values created by the program. In an embodiment, the intermediate nodes that represent the intermediate values are determined by the system parsing the program code. In an embodiment, the intermediate nodes represent intermediate values and comprise various characteristics of the intermediate values. In an embodiment, the intermediate nodes comprise indications of the sizes of the intermediate values.

In an embodiment, the system performing the process 700 links 714 the leaf nodes that represent program inputs to the root node via the intermediate nodes. In an embodiment, the system links the leaf nodes to the intermediate nodes the leaf nodes are associated with; in an embodiment, for example, a group of leaf nodes can be linked to an intermediate node that comprises an intermediate result of an operation performed on the group of leaf nodes. In an embodiment, the intermediate nodes are linked to the root node that represents the output of one or more processes on the intermediate nodes. In an embodiment, for example, intermediate nodes can be linked to a root node that comprises a result of one or more processes on the intermediate nodes.

In an embodiment, intermediate nodes can be linked to other intermediate nodes that can represent intermediate results of one or more processes performed on the intermediate nodes. In an embodiment, the intermediate nodes can be linked to any number of other intermediate nodes. In an embodiment, the end result of the intermediate nodes will link to a root node representing the final output/result of one or more processes on the intermediate nodes. Further information regarding the linking of the leaf nodes to the root node via the intermediate nodes can be found in the description of FIG. 3.

Figure 8:
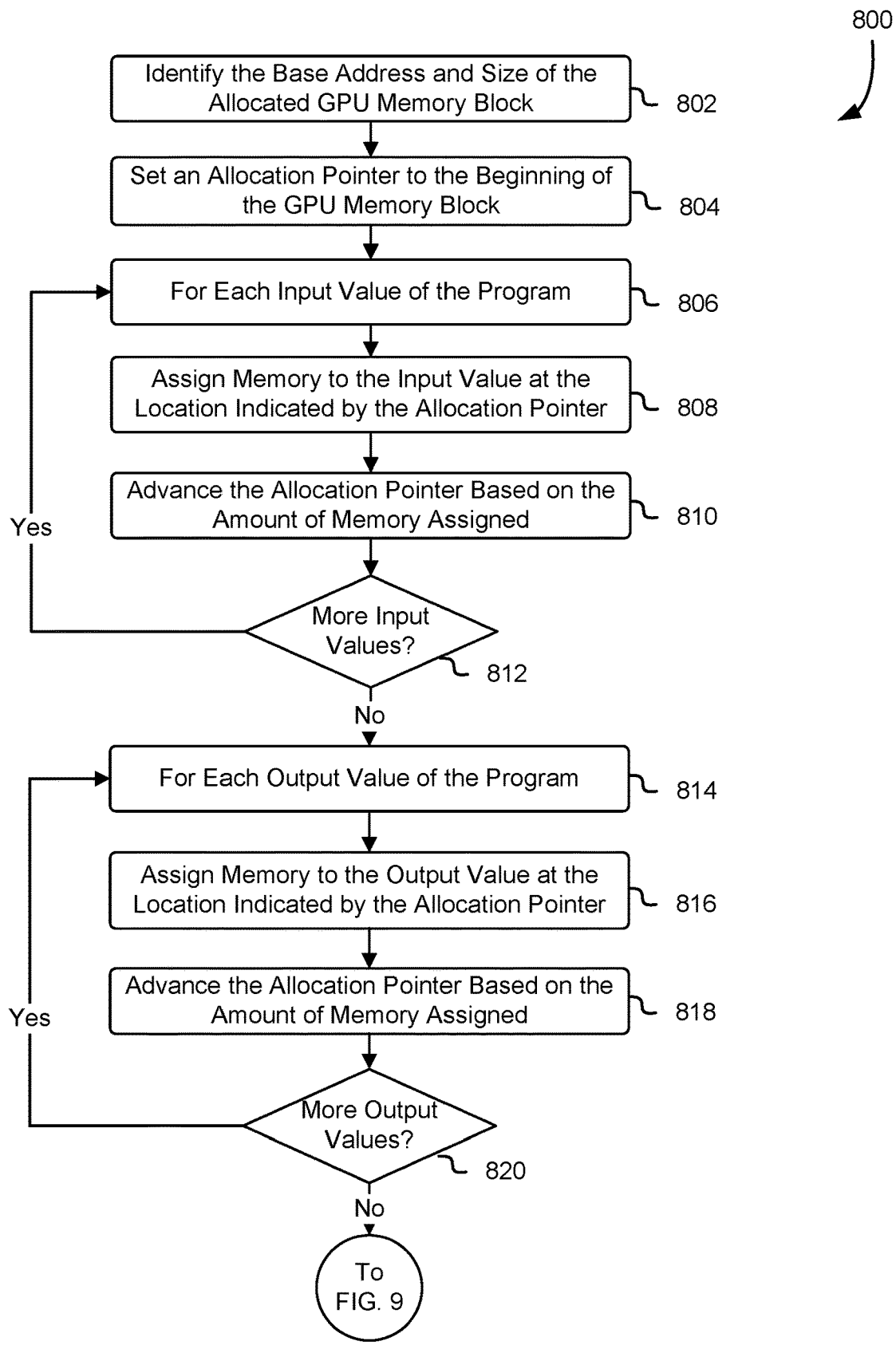
FIG. 8 illustrates an example of a first portion of a process that, as a result of being performed by a computer system, maps application data to a block of memory allocated within a GPU, in an embodiment.

FIG. 8 illustrates an example of a first portion of a process that, as a result of being performed by a computer system, maps application data to a block of memory allocated within a GPU, in an embodiment. In an embodiment, the system performing the process 800 identifies 802 the base address and size of the allocated GPU memory block. In an embodiment, the base address of the allocated GPU memory block is the address in GPU memory where the allocated GPU memory block begins. In an embodiment, the base address and size of the allocated GPU memory block can be found in a lookup table that is generated during the allocation of the allocated GPU memory block. Further information regarding the lookup table can be found in the description of FIG. 5.

In an embodiment, the system performing the process 800 sets 804 an allocation pointer to the beginning of the GPU memory block. In an embodiment, a pointer is a programming language object that stores the location of a memory address. In an embodiment, an allocation pointer stores the location of a memory address that will be mapped to a value such as an input value, output value, or intermediate value of a computer program. In an embodiment, the allocation pointer can be stored in a separately allocated portion of GPU memory. In an alternative embodiment, the allocation pointer can be stored on other memory, such as main memory, that a computer system comprises.

In an embodiment, the system performing the process 800 applies a process for 806 each input value of the program. In an embodiment, the program refers to a computer program that has been analyzed by a system to determine the computer program's input values, output values, and intermediate values. In an embodiment, the allocated GPU memory block comprises memory mapped to the computer program's input values, output values, and intermediate values. In an embodiment, the system performing process 800 iterates through each input value of the program.

In an embodiment, the system performing the process 800 assigns 808 memory to the input value at the location indicated by the allocation pointer. In an embodiment, the memory location indicated by the allocation pointer is assigned to the input value such that the input value can be stored in the memory location. In an embodiment, the amount of memory assigned is determined by the size of the input value. In an embodiment, the memory assigned is assigned such that the input value can be stored in the assigned memory. In an embodiment, the system performing the process 800 advances 810 the allocation pointer based on the amount of memory assigned. In an embodiment, the allocation pointer is advanced based on the amount of memory assigned such that the allocation pointer points to a new location in memory that does not overlap with the memory previously assigned to the input value.

In an embodiment, the system performing the process 800 determines if more 812 input values remain to be assigned. In an embodiment, if the system determines there are more input values remaining to be assigned, the system repeats the processes 806-812 for the remaining input values. In an embodiment, if the system determines that there are no more input values, the system then begins to process the output values of the program. In an embodiment, the system performing the process 800 applies a process for 814 each output value of the program. In an embodiment, the system performing process 800 iterates through each output value of the program.

In an embodiment, the system performing the process 800 assigns 816 memory to the output value at the location indicated by the allocation pointer. In an embodiment, the memory, location indicated by the allocation pointer is assigned to the output value such that the output value can be stored in the memory location. In an embodiment, the amount of memory assigned is determined by the size of the output value. In an embodiment, the memory assigned is assigned such that the output value can be stored in the assigned memory. In an embodiment, the system performing the process 800 advances 818 the allocation pointer based on the amount of memory assigned. In an embodiment, the allocation pointer is advanced based on the amount of memory assigned such that the allocation pointer points to a new location in memory that does not overlap with the memory previously assigned to the output value.

In an embodiment, the system performing the process 800 determines if more 820 output values remain to be assigned, in an embodiment, if the system determines there are more output values remaining to be assigned, the system repeats the processes 814-820 for the remaining output values. In an embodiment, if the system determines that there are no more output values, the system begins to process the intermediate values of the program, continued in FIG. 9.

Figure 9:
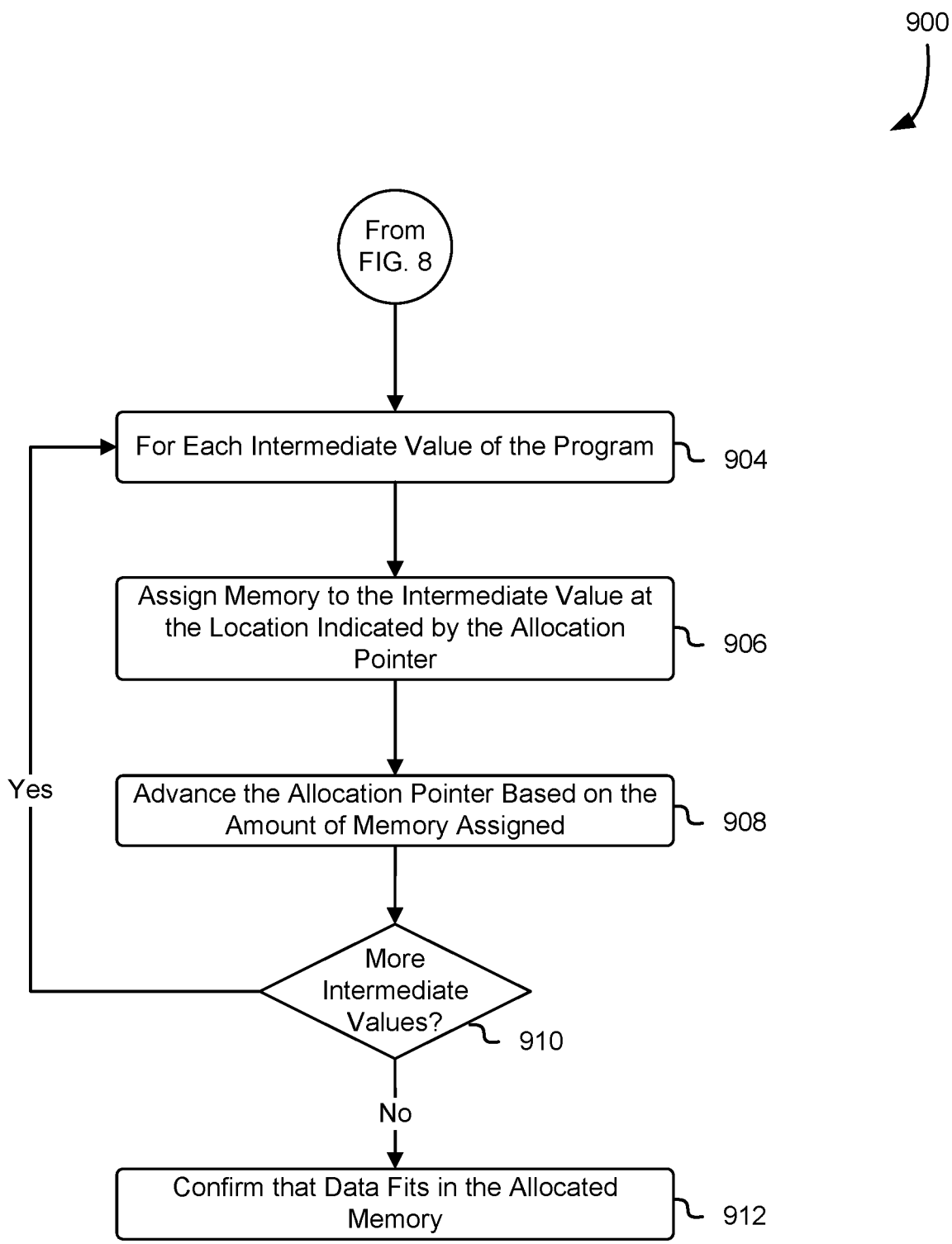
FIG. 9 illustrates an example of a second portion of a process that, as a result of being performed by computer system, maps application data to a block of memory allocated within a GPU, in an embodiment.

FIG. 9 illustrates an example of a second portion of a process that, as a result of being performed by computer system, maps application data to a block of memory allocated within a GPU, in an embodiment. In an embodiment, the system performing the process 900 applies a process for 904 each intermediate value of the program. In an embodiment, the program refers to a computer program that has been analyzed by a system to determine the computer program's input values, output values, and intermediate values. In an embodiment, the allocated GPU memory block comprises memory mapped to the computer program's input values, output values, and intermediate values. In an embodiment, the system performing process 900 iterates through each intermediate value of the program.

In an embodiment, the system performing the process 900 assigns 906 memory to the intermediate value at the location indicated by the allocation pointer. In an embodiment, the memory location indicated by the allocation pointer is assigned to the intermediate value such that the intermediate value can be stored in the memory location. In an embodiment, the amount of memory assigned is determined by the size of the intermediate value. In an embodiment, the memory assigned is assigned such that the intermediate value can be stored in the assigned memory. In an embodiment, the system performing the process 900 advances 908 the allocation pointer based on the amount of memory assigned. In an embodiment, the allocation pointer is advanced based on the amount of memory assigned such that the allocation pointer points to a new location in memory that does not overlap with the memory previously assigned to the intermediate value.

In an embodiment, the system performing the process 900 determines if more 910 intermediate values remain to be assigned. In an embodiment, if the system determines there are more intermediate values remaining to be assigned, the system repeats the processes 904, 906, 908, and 910 for the remaining intermediate values. In an embodiment, if the system determines that there are no more intermediate values, the system ceases processing of the intermediate values of the program.

In an embodiment, the system performing the process 900 confirms 912 that data fits in the allocated memory. In an embodiment, the aforementioned data is the data that has been allocated in the allocated GPU memory block, and comprises the input values, output values, and intermediate values of the computer program. In an embodiment, the system confirms the data fits by performing one or more verification checks on the allocated memory to determine if the data exceeds the bounds of the allocated memory or if the data fits within the bounds of the allocated memory.

Figure 10:
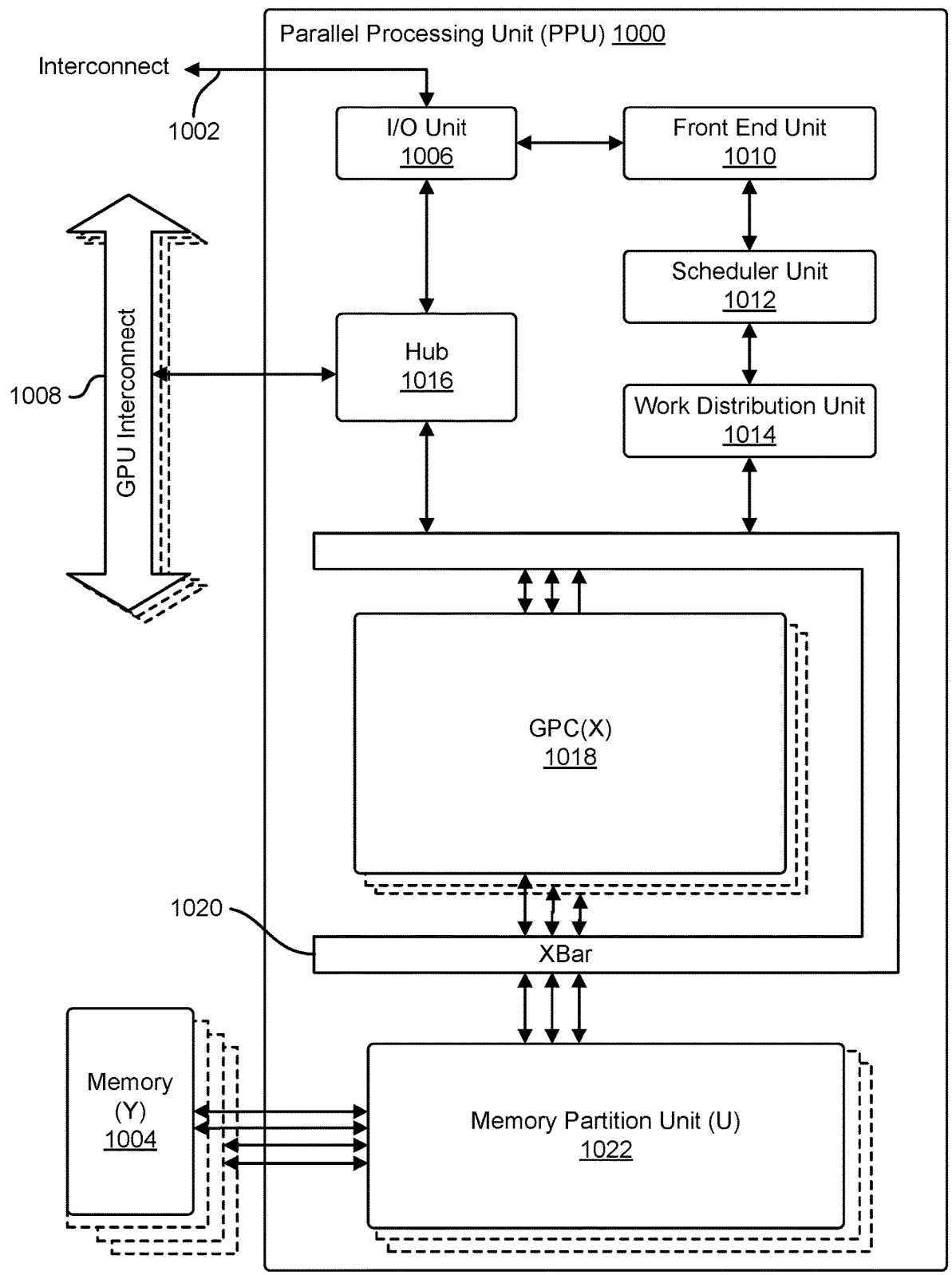
FIG. 10 illustrates an example of parallel processing unit ("PPU"), in accordance with an embodiment.

FIG. 10 illustrates a parallel processing unit ("PPU") 1000, in accordance with one embodiment. In an embodiment, the PPU 1000 is configured with machine-readable code that, if executed by the PPU, causes the PPU to perform some or all of processes and techniques described throughout this disclosure. In an embodiment, the PPU 1000 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 1000. In an embodiment, the PPU 1000 is a graphics processing, unit ("GPU") configured to implement a graphics rendering, pipeline for processing three-dimensional ("3D") graphics data in order to generate two-dimensional ("2D") image data for display on a display device such as a liquid crystal display (LCD) device. In an embodiment, the PPU 1000 is utilized for perform computations such as linear algebra operations and machine-learning operations. FIG. 10 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 1000 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 1000 includes an Input/Output ("I/O") unit 1005, a front-end unit 1010, a scheduler unit 1012, a work distribution unit 1014, a hub 1016, a crossbar ("Xbar") 1020, one or more general processing clusters ("GPCs") 1018, and one or more partition units 1022. In an embodiment, the PPU 1000 is connected to a host processor or other PPUs 1000 via one or more high-speed GPU interconnects 108. In an embodiment, the PPU 1000 is connected to a host processor or other peripheral devices via an interconnect 1002. In an embodiment, the PPU 1000 is connected to a local memory comprising one or more memory devices 1004. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 1008 may refer to a wire-based multi-lane communications link that is used by systems to scale and include one or more PPUs 1000 combined with one or more CPUs, supports cache coherence between the PPUs 1000 and CPUs, and CPU mastering. In an embodiment, data and/or commands are transmitted by the high-speed GPU interconnect 108 through the hub 1016 to/from other units of the PPU 1000 such as one or more copy engines, video encoders, video decoders, power management units, and other components which may not be explicitly illustrated in FIG. 10.

In an embodiment, the I/O unit 1006 is configured to transmit and receive communications (e.g., commands, data) from a host processor (not illustrated in FIG. 10) over the system bus 1002. In an embodiment, the I/O unit 1005 communicates with the host processor directly via the system bus 1002 or through one or more intermediate devices such as a memory bridge. In an embodiment, the I/O unit 1005 may communicate with one or more other processors, such as one or more the PPUs 1000 via the system bus 1002. In an embodiment, the I/O unit 1005 implements a Peripheral Component Interconnect Express ("PCIe") interface for communications over a PCIe bus. In an embodiment, the I/O unit 1005 implements interfaces for communicating with external devices.

In an embodiment, the I/O unit 1005 decodes packets received via the system bus 1002. In an embodiment, at least some packets represent commands configured to cause the PPU 1000 to perform various operations. In an embodiment, the I/O unit 1005 transmits the decoded commands to various other units of the PPU 1000 as specified by the commands. In an embodiment, commands are transmitted to the front-end unit 1010 and/or transmitted to the hub 1016 or other units of the PPU 1000 such as one or more copy engines, a video encoder, a video decoder, a power management unit, etc. (not explicitly illustrated in FIG. 10). In an embodiment, the I/O unit 1005 is configured to route communications between and among the various logical units of the PPU 1000.

In an embodiment, a program executed by the host processor encodes a command stream in a buffer that provides workloads to the PPU 1000 for processing. In an embodiment, a workload comprises instructions and data to be processed by those instructions. In an embodiment, the buffer is a region in a memory that is accessible (e.g., read/write) by both the host processor and the PPU 1000—the host interface unit may be configured to access the buffer in a system memory connected to the system bus 1002 via memory requests transmitted over the system bus 1002 by the I/O unit 1005. In an embodiment, the host processor writes the command stream to the buffer and then transmits a pointer to the start of the command stream to the PPU 1000 such that the front-end unit 1010 receives pointers to one or more command streams and manages the one or more streams, reading commands from the streams and forwarding commands to the various units of the PPU 1000.

In an embodiment, the front-end unit 1010 is coupled to a scheduler unit 1012 that configures the various GPCs 1018 to process tasks defined by the one or more streams. In an embodiment, the scheduler unit 1012 is configured to track state information related to the various tasks managed by the scheduler unit 1012 where the state information may indicate which GPC 1018 a task is assigned to, whether the task is active or inactive, a priority level associated with the task, and so forth. In an embodiment, the scheduler unit 1012 manages the execution of a plurality of tasks on the one or more GPCs 1018.

In an embodiment, the scheduler unit 1012 is coupled to a work distribution unit 1014 that is configured to dispatch tasks for execution on the GPCs 1018. In an embodiment, the work distribution unit 1014 tracks a number of scheduled tasks received from the scheduler unit 1012 and the work distribution unit 1014 manages a pending task pool and an active task pool for each of the GPCs 1018. In an embodiment, the pending task pool comprises a number of slots (e.g., 32 slots) that contain tasks assigned to be processed by a particular GPC 1018; the active task pool may comprise a number of slots (e.g., 4 slots) for tasks that are actively being processed by the GPCs 1018 such that as a GPC 1018 completes the execution of a task, that task is evicted from the active task pool for the GPC 1018 and one of the other tasks from the pending task pool is selected and scheduled for execution on the GPC 1018. In an embodiment, if an active task is idle on the GPC 1018, such as while waiting for a data dependency to be resolved, then the active task is evicted from the GPC 1018 and returned to the pending task pool while another task in the pending task pool is selected and scheduled for execution on the GPC 1018.

In an embodiment, the work distribution unit 1014 communicates with the one or more GPCs 1018 via XBar 1020. In an embodiment, the XBar 1020 is an interconnect network that couples many of the units of the PPU 1000 to other units of the PPU 1000 and can be configured to couple the work distribution unit 1014 to a particular GPC 1018. Although not shown explicitly, one or more other units of the PPU 1000 may also be connected to the XBar 1020 via the hub 1016.

The tasks are managed by the scheduler unit 1012 and dispatched to a GPC 1018 by the work distribution unit 1014. The GPC 1018 is configured to process the task and generate results. The results may be consumed by other tasks within the GPC 1018, routed to a different GPC 1018 via the XBar 1020, or stored in the memory 1004. The results can be written to the memory 1004 via the partition units 1022, which implement a memory interface for reading and writing data to/from the memory 1004. The results can be transmitted to another PPU 1004 or CPU via the high-speed GPU interconnect 108. In an embodiment, the PPU 1000 includes a number U of partition units 1022 that is equal to the number of separate and distinct memory devices 1004 coupled to the PPU 1000. A partition unit 1022 will be described in more detail below in conjunction with FIG. 12.

In an embodiment, a host processor executes a driver kernel that implements an application programming interface ("API") that enables one or more applications executing on the host processor to schedule operations for execution on the PPU 1000. In an embodiment, multiple compute applications are simultaneously executed by the PPU 1000 and the PPU 1000 provides isolation, quality of service ("QoS"), and independent address spaces for the multiple compute applications. In an embodiment, an application generates instructions (e.g., in the form of API calls) that cause the driver kernel to generate one or more tasks for execution by the PPU 1000 and the driver kernel outputs tasks to one or more streams being processed by the PPU 1000. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment, elsewhere in the application.

Figure 11:
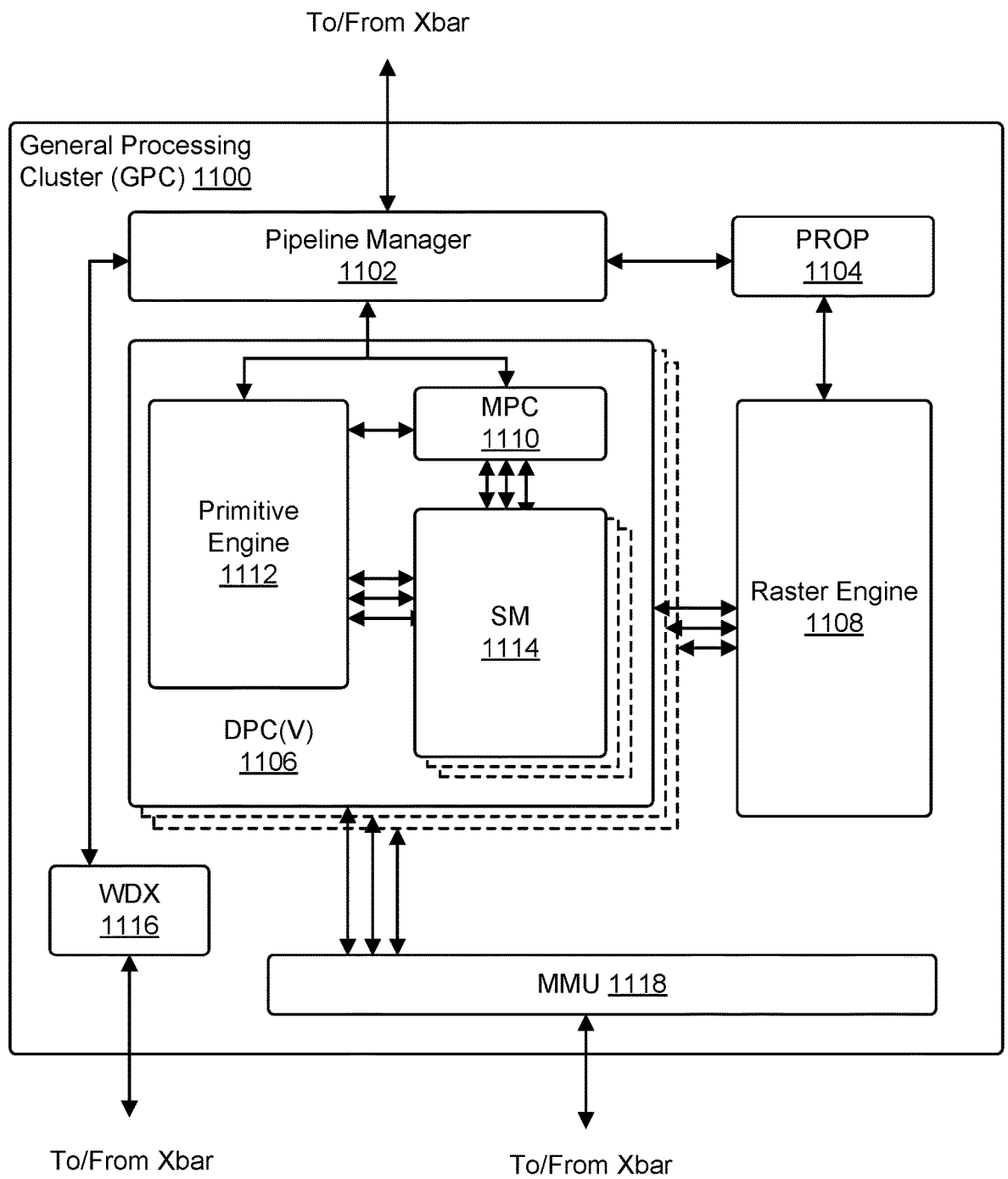
FIG. 11 illustrates an example of a general processing cluster ("GPC"), in accordance with one embodiment.

FIG. 11 illustrates a GPC 1100 such as the GPC illustrated of the PPU 1000 of FIG. 10, in accordance with one embodiment. In an embodiment, each GPC 1100 includes a number of hardware units for processing tasks and each GPC 1100 includes a pipeline manager 1102, a pre-raster operations unit ("PROP") 1104, a raster engine 1108, a work distribution crossbar ("WDX") 1116, a memory management unit ("MMU") 1118, one or more Data Processing Clusters ("DPCs") 1106, and any suitable combination of parts. It will be appreciated that the GPC 1100 of FIG. 11 may include other hardware units in lieu of or in addition to the units shown in FIG. 11.

In an embodiment, the operation of the GPC 1100 is controlled by the pipeline manager 1102. The pipeline manager 1102 manages the configuration of the one or more DPCs 1106 for processing tasks allocated to the GPC 1100. In an embodiment, the pipeline manager 1102 configures at least one of the one or more DPCs 1106 to implement at least a portion of a graphics rendering pipeline. In an embodiment, a DPC 1106 is configured to execute a vertex shader program on the programmable streaming multiprocessor ("SM") 1114. The pipeline manager 1102 is configured to route packets received from a work distribution to the appropriate logical units within the GPC 1100, in an embodiment, and some packets may be routed to fixed function hardware units in the PROP 1104 and/or raster engine 1108 while other packets may be routed to the DPCs 1106 for processing by the primitive engine 1112 or the SM 1114. In an embodiment, the pipeline manager 1102 configures at least one of the one or more DPCs 1106 to implement a neural network model and/or a computing pipeline.

The PROP unit 1104 is configured, in an embodiment, to route data generated by the raster engine 1108 and the DPCs 1106 to a Raster Operations ("ROP") unit in the memory partition unit, described in more detail above. In an embodiment, the PROP unit 1104 is configured to perform optimizations for color blending, organize pixel data, perform address translations, and more. The raster engine 1108 includes a number of fixed function hardware units configured to perform various raster operations, in an embodiment, and the raster engine 1108 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. IN an embodiment, the fragments that survive clipping and culling are passed to the fine raster engine to generate attributes for the pixel fragments based on the plane equations generated by the setup engine. In an embodiment, the output of the raster engine 1108 comprises fragments to be processed by any suitable entity such as by a fragment shader implemented within a DPC 1106.

In an embodiment, each DPC 1106 included in the GPC 1100 comprises an M-Pipe Controller ("MPC") 1110; a primitive engine 1112; one or more SMs 1114; and any suitable combination thereof. In an embodiment, the MPC 1110 controls the operation of the DPC 1106, routing packets received from the pipeline manager 1102 to the appropriate units in the DPC 1106. In an embodiment, packets associated with a vertex are routed to the primitive engine 1112, which is configured to fetch vertex attributes associated with the vertex from memory; in contrast, packets associated with a shader program may be transmitted to the SM 1114.

In an embodiment, the SM 1114 comprises a programmable streaming processor that is configured to process tasks represented by a number of threads. In an embodiment, the SM 1114 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 1114 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread and threads executing the same instructions may be converged and executed in parallel for better efficiency. In an embodiment, the SM 1114 is described in more detail below.

In an embodiment, the MMU 1118 provides an interface between the GPC 1100 and the memory partition unit and the MMU 1118 provides translation of virtual addresses into physical addresses, memory protection, and arbitration of memory requests. In an embodiment, the MMU 1118 provides one or more translation lookaside buffers ("TLBs") for performing translation of virtual addresses into physical addresses in memory.

Figure 12:
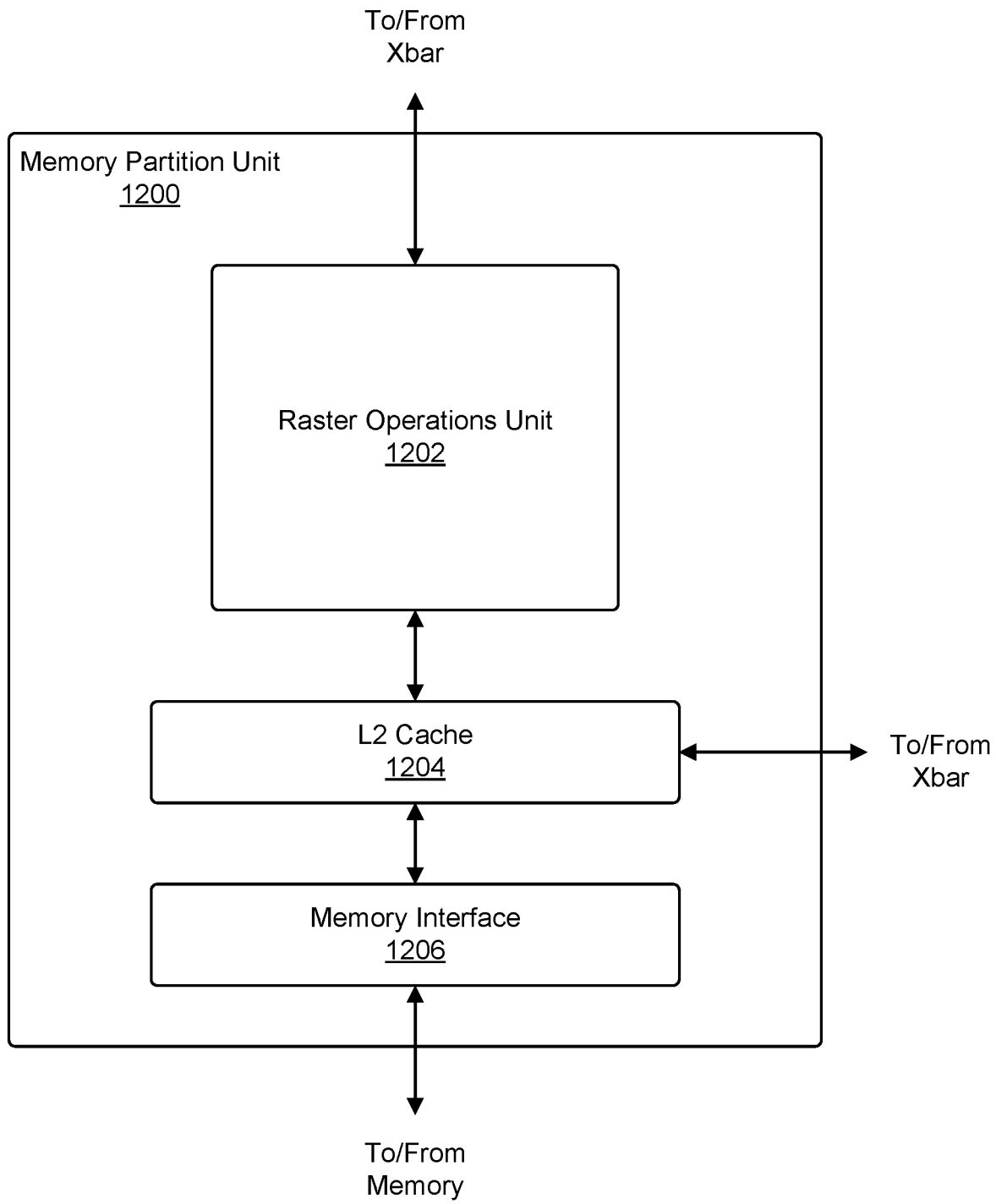
FIG. 12 illustrates an example of a memory partition unit, in accordance with one embodiment.

FIG. 12 illustrates a memory partition unit of a PPU, in accordance with one embodiment. In an embodiment, the memory partition unit 1200 includes a Raster Operations ("ROP") unit 1202; a level two ("L2") cache 1204; a memory interface 1206; and any suitable combination thereof. The memory interface 1206 is coupled to the memory. Memory interface 1206 may implement 32, 64, 128, 1024-bit data buses, or the like, for high-speed data transfer. In an embodiment, the PPU incorporates U memory interfaces 1206, one memory interface 1206 per pair of partition units 1200, where each pair of partition units 1200 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 1206 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 1200 supports a unified memory to provide a single unified virtual address space for CPU and PPU memory, enabling data sharing between virtual memory systems. In an embodiment the frequency of accesses by a PPU to memory located on other processors is trace to ensure that memory pages are moved to the physical memory of the PPU that is accessing the pages more frequently. In an embodiment, the high-speed GPU interconnect 108 supports address translation services allowing the PPU to directly access a CPU's page tables and providing full access to CPU memory by the PPU.

In an embodiment, copy engines transfer data between multiple PPUs or between PPUs and CPUs. In an embodiment, the copy engines can generate page faults for addresses that are not mapped into the page tables and the memory partition unit 1200 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regard as to whether the memory pages are resident, and the copy process is transparent.

Data from the memory of FIG. 10 or other system memory is fetched by the memory partition unit 1200 and stored in the L2 cache 1204, which is located on-chip and is shared between the various GPCs, in accordance with one embodiment. Each memory partition unit 1200, in an embodiment, includes at least a portion of the L2 cache 1160 associated with a corresponding memory device. In an embodiment, lower level caches are implemented in various units within the GPCs. In an embodiment, each of the SMs 1240 may implement a level one ("L1") cache wherein the L1 cache is private memory that is dedicated to a particular SM 1240 and data from the L2 cache 1204 is fetched and stored in each of the L1 caches for processing in the functional units of the SMs 1240. In an embodiment, the L2 cache 1204 is coupled to the memory interface 1206 and the XBar 1020.

The ROP unit 1202 performs graphics raster operations related to pixel color, such as color compression, pixel blending, and more, in an embodiment. The ROP unit 1250, in an embodiment, implements depth testing in conjunction with the raster engine 1225, receiving a depth for a sample location associated with a pixel fragment from the culling engine of the raster engine 1225. In an embodiment, the depth is tested against a corresponding depth in a depth buffer for a sample location associated with the fragment. In an embodiment, if the fragment passes the depth test for the sample location, then the ROP unit 1202 updates the depth buffer and transmits a result of the depth test to the raster engine 1225. It will be appreciated that the number of partition units 1200 may be different than the number of GPCs and, therefore, each ROP unit 1202 can, in an embodiment, be coupled to each of the GPCs. In an embodiment, the ROP unit 1202 tracks packets received from the different GPCs and determines which that a result generated by the ROP unit 1202 is routed to through the Xbar.

Figure 13:
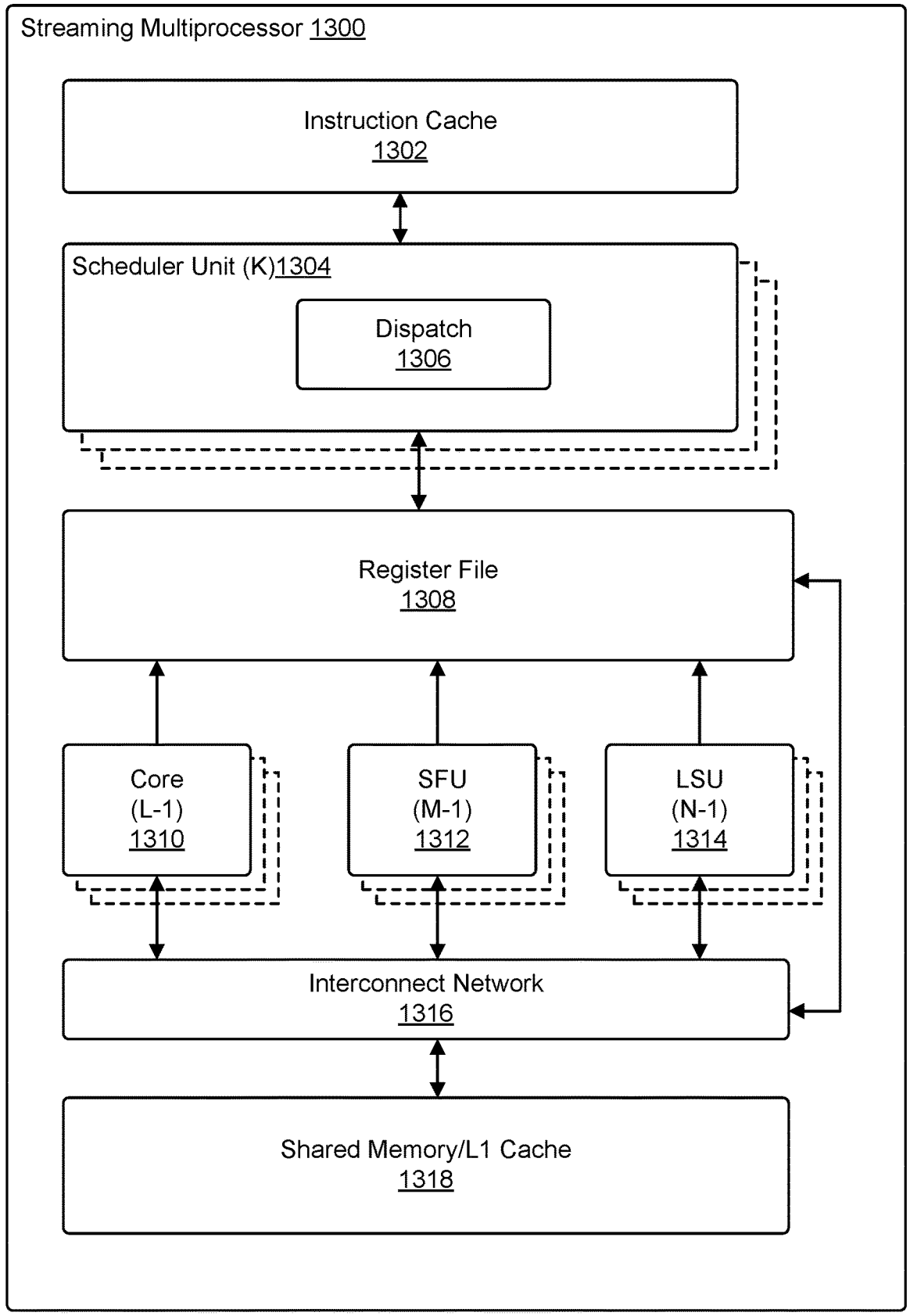
FIG. 13 illustrates an example of a streaming multi-processor, in accordance with one embodiment.

FIG. 13 illustrates a streaming multi-processor such as the streaming multi-processor of FIG. 11, in accordance with one embodiment. In an embodiment, the SM 1300 includes: an instruction cache 1302; one or more scheduler units 1304; a register file 1308; one or more processing cores 1310; one or more special function units ("SFUs") 1312; one or more load/store units ("LSUs") 1314; an interconnect network 1316; a shared memory/L1 cache 1318; and any suitable combination thereof. In an embodiment, the work distribution unit dispatches tasks for execution on the GPCs of the PPU and the each task is allocated to a particular DPC within a GPC and, if the task is associated with a shader program, the task is allocated to an SM 1300. In an embodiment, the scheduler unit 1304 receives the tasks from the work distribution unit and manages instruction scheduling for one or more thread blocks assigned to the SM 1300. In an embodiment, the scheduler unit 1304 schedules thread blocks for execution as warps of parallel threads, wherein each thread block is allocated at least one warp. In an embodiment, each warp executes threads. In an embodiment, the scheduler unit 1304 manages a plurality of different thread blocks, allocating the warps to the different thread blocks and then dispatching instructions from the plurality of different cooperative groups to the various functional units (e.g., cores 1310, SFUs 1312, and LSUs 1314) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization amongst thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 1306 is configured to transmit instructions to one or more of the functional units and the scheduler unit 1304 includes two dispatch units 1306 that enable two different instructions from the same warp to be dispatched during each clock cycle. In an embodiment, each scheduler unit 1304 includes a single dispatch unit 1306 or additional dispatch units 1306.

Each SM 1300, in an embodiment, includes a register file 1308 that provides a set of registers for the functional units of the SM 1300. In an embodiment, the register file 1308 is divided between each of the functional units such that each functional unit is allocated a dedicated portion of the register file 1308. In an embodiment, the register file 1308 is divided between the different warps being executed by the SM 1300 and the register file 1308 provides temporary storage for operands connected to the data paths of the functional units. In an embodiment, each SM 1300 comprises a plurality of L processing cores 1310. In an embodiment, the SM 1300 includes a large number (e.g., 128 or more) of distinct processing cores 1310. Each core 1310, in an embodiment, includes a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1310 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 1310. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A× B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 1300 comprises M SFUs 1312 that perform special functions (e.g., attribute evaluation, reciprocal square root, and the like). In an embodiment, the SFUs 1312 include a tree traversal unit configured to traverse a hierarchical tree data structure. In an embodiment, the SFUs 1312 include texture unit configured to perform texture map filtering operations. In an embodiment, the texture units are configured to load texture maps (e.g., a 2D array of texels) from the memory and sample the texture maps to produce sampled texture values for use in shader programs executed by the SM 1300. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 1300 includes two texture units.

Each SM 1300 comprises N LSUs 1254 that implement load and store operations between the shared memory/L1 cache 1206 and the register file 1308, in an embodiment. Each SM 1300 includes an interconnect network 1316 that connects each of the functional units to the register file 1308 and the LSU 1314 to the register file 1308, shared memory/L1 cache 1318 in an embodiment. In an embodiment, the interconnect network 1316 is a crossbar that can be configured to connect any of the functional units to any of the registers in the register file 1308 and connect the LSUs 1314 to the register file and memory locations in shared memory/L1 cache 1318.

The shared memory/L1 cache 1318 is an array of on-chip memory that allows for data storage and communication between the SM 1300 and the primitive engine and between threads in the SM 1300 in an embodiment. In an embodiment, the shared memory/L1 cache 1318 comprises 128 KB of storage capacity and is in the path from the SM 1300 to the partition unit. The shared memory/L1 cache 1318, in an embodiment, is used to cache reads and writes. One or more of the shared memory/L1 cache 1318, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 1318 enables the shared memory/L1 cache 1318 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 1300 to execute the program and perform calculations, shared memory/L1 cache 1318 to communicate between threads, and the LSU 1314 to read and write global memory through the shared memory/L1 cache 1318 and the memory partition unit, in accordance with one embodiment. In an embodiment, when configured for general purpose parallel computation, the SM 1300 writes commands that the scheduler unit that can be used to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrate graphics processing unit ("iGPU") included in the chipset of the motherboard.

Figure 14:
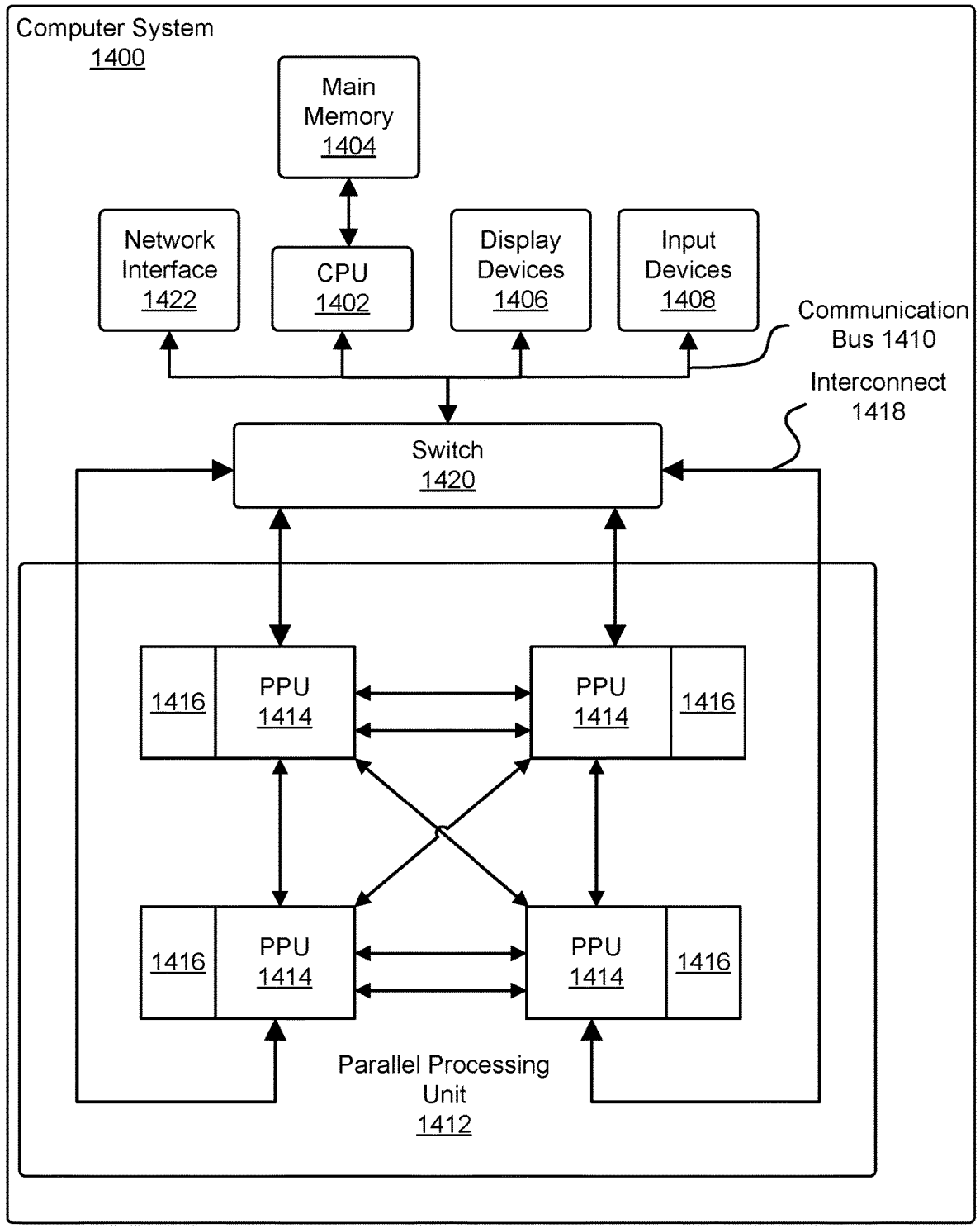
FIG. 14 illustrates a computer system in which the various examples can be implemented, in accordance with one embodiment.

FIG. 14 illustrates a computer system 1400 in which the various architecture and/or functionality can be implemented, in accordance with one embodiment. The computer system 1400, in an embodiment, is configured to implement various processes and methods described throughout this disclosure.

In an embodiment, the computer system 1400 comprises at least one central processing unit 1402 that is connected to a communication bus 1410 implemented using any suitable protocol, such as PCI (Peripheral Component interconnect), PCI-Express, AGP (Accelerated Graphics Port), Hyper-Transport, or any other bus or point-to-point communication protocol(s). In an embodiment, the computer system 1400 includes a main memory 1404 and control logic (e.g., implemented as hardware, software, or a combination thereof) and data are stored in the main memory 1404 which may take the form of random access memory ("RAM"). In an embodiment, a network interface subsystem 1422 provides an interface to other computing devices and networks for receiving data from and transmitting data to other systems from the computer system 1400.

The computer system 1400, in an embodiment, includes input devices 1408, the parallel processing unit 1412, and display devices 1406 which can be implemented using a conventional CRT (cathode ray tube), LCD (liquid crystal display), LED (light emitting diode), plasma display, or other suitable display technologies. In an embodiment, user input is received from input devices 1408 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1404 and/or secondary storage. Computer programs, if executed by one or more processors, enable the system 1400 to perform various functions in accordance with one embodiment. The memory 1404, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1402; parallel processing unit 1412; an integrated circuit capable of at least a portion of the capabilities of both the central processor 1402 the parallel processing unit 1412; a chipset (e.g., a group of integrated circuits designed to work and sold as a unit for performing related functions, etc.); and any suitable combination of integrated circuit.

In an embodiment, the architecture and/or functionality of the various previous figures is be implemented in the context of a general computer system, a circuit board system, a game console system dedicated for entertainment purposes, an application-specific system, and more. In an embodiment, the computer system 1400 may take the form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In an embodiment, a parallel processing unit 1412 includes a plurality of PPUs 1414 and associated memories 1416. In an embodiment, the PPUs are connected to a host processor or other peripheral devices via an interconnect 1418 and a switch 1420 or multiplexer. In an embodiment, the parallel processing unit 1412 distributes computational tasks across the PPUs 1414 which can be parallelizable—for example, as part of the distribution of computational tasks across multiple GPU thread blocks. In an embodiment, memory is shared and accessible (e.g., for read and/or write access) across some or all of the PPUs 1414, although such shared memory may incur performance penalties relative to the use of local memory and registers resident to a PPU. In an embodiment, the operation of the PPUs 1414 is synchronized through the use of a command such as syncthreads( ) which requires all threads in a block (e.g., executed across multiple PPUs 1414) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely, intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
using one or more circuits of a processor to cause the processor to partition and store data in a plurality of storage locations based, at least in part, upon one or more dependencies between two or more processor instructions.

2. The method of claim 1, wherein the data is to be stored as persistent data and non-persistent data based, at least in part, upon the one or more dependencies.

3. The method of claim 2, wherein:
the one or more circuits is further to cause the processor to perform the two or more processor instructions according to a computer program, where the persistent data is to include a set of inputs of the computer program and an output of the computer program.

4. The method of claim 2, wherein storing the data as the persistent data and the non-persistent data comprises:
allocating memory at the plurality of storage locations;
storing the persistent data only in a first contiguous region of the allocated memory; and
storing the non-persistent data only in a second contiguous region of the allocated memory, the second contiguous region to follow the first contiguous region.

5. The method of claim 4, wherein:
the one or more circuits is further to cause the processor to perform the two or more processor instructions according to a computer program;
the allocated memory is to be a contiguous block of memory on a graphics processing unit; and
the computer program is to run on a processor of the graphics processing unit.

6. The method of claim 5, wherein:
the graphics processing unit is part of a computer system having a main memory separate from memory on the graphics processing unit; and
a portion of the memory on the graphics processing unit is to be mapped into a memory space shared with the main memory.

7. A processor, comprising: one or more circuits to cause data to be partitioned and stored in a plurality of storage locations based, at least in part, upon one or more dependencies between two or more processor instructions.

8. The processor of claim 7, wherein the data is to be stored as persistent data and non-persistent data based, at least in part, upon the one or more dependencies.

9. The processor of claim 8, wherein the persistent data is to be persistent throughout an execution of a computer program to perform the two or more processor instructions and the non-persistent data is not to be persistent throughout the execution.

10. The processor of claim 8, wherein:
the persistent data includes a set of inputs of a computer program to perform the two or more processor instructions;
the persistent data is to include an output of the computer program;
the non-persistent data is to include a set of intermediate values of the computer program; and
the one or more dependencies are to be directed between the set of inputs and the set of intermediate values and between the set of intermediate values and the output.

11. The processor of claim 8, wherein:
the non-persistent data includes a set of intermediate values of a computer program to perform the two or more processor instructions; and
the one or more circuits is further to cause memory to be allocated at the plurality of storage locations at least by:
allocating a block of memory to act as a memory heap to be used by the computer program; and
allocating a contiguous region on the memory heap to store the set of intermediate values.

12. A system, comprising:
one or more processors; and
memory to store computer-executable instructions that, if executed, cause the one or more processors to partition and store data in a plurality of storage locations based, at least in part, upon one or more dependencies between two or more processor instructions.

13. The system of claim 12, wherein the data is to be stored as persistent data and non-persistent data based, at least in part, upon the one or more dependencies.

14. The system of claim 13, wherein the computer-executable instructions are to store the data as the persistent data and the non-persistent data, including instructions that, if executed, cause the one or more processors to:
allocate memory at the plurality of storage locations;
store the persistent data only in a first contiguous region of the allocated memory; and
store the non-persistent data only in a second contiguous region of the allocated memory, the second contiguous region to follow the first contiguous region.

15. The system of claim 14, wherein the instructions to allocate the memory include instructions that, if executed, cause the one or more processors to allocate memory space to a computer program to perform the two or more processor instructions by recording, in an allocation table stored on a graphics processing unit, information that is to reserve the memory space to be used by the computer program.

16. The system of claim 14, wherein the instructions to allocate the memory include instructions that, if executed, cause the one or more processors to allocate all GPU memory to be used by a computer program to perform the two or more processor instructions in a single allocation operation.

17. The system of claim 13, wherein the computer-executable instructions further include instructions that, if executed, cause the one or more processors to:
perform the two or more processor instructions according to a computer program describing a calculation;
analyze the calculation to generate a tree representing data manipulated by the calculation, the tree to contain a set of leaf nodes corresponding to input data of the calculation, a set of internal nodes corresponding to intermediate data determined as part of performing the calculation, and a root node that is to represent a result of the calculation; and
identify the persistent data based, at least in part, on the tree.

18. The system of claim 17, wherein the computer-executable instructions further include instructions that, if executed, cause the one or more processors to:
allocate a block of memory within a graphics processing unit to act as a memory heap to be used by the computer program; and
allocate memory space on the memory heap to store the intermediate data.

19. The system of claim 18, wherein the computer-executable instructions further include instructions that, if executed, cause the one or more processors to store, corresponding to a variable to be used by the computer program, information that is to identify an amount of memory and a memory location relative to a start of the memory heap.

20. The system of claim 18, wherein the computer-executable instructions further include instructions that, if executed, cause the one or more processors to relocate the memory heap to a different memory location in the graphics processing unit as a result of a memory defragmentation operation.

21. One or more non-transitory computer-readable storage media having stored thereon executable instructions that, if executed by one or more processors of a computer system, cause the computer system to at least partition and store data in a plurality of storage locations based, at least in part, upon one or more dependencies between two or more processor instructions.

22. The one or more non-transitory computer-readable storage media of claim 21, wherein the data is to be stored as persistent data and non-persistent data based, at least in part, upon the one or more dependencies.

23. The one or more non-transitory computer-readable storage media of claim 22, wherein the executable instructions to at least store the data as the persistent data and the non-persistent data include instructions that, if executed by the one or more processors, cause the computer system to at least:
   allocate memory at the plurality of storage locations;
   store the persistent data only in a first contiguous region of the allocated memory; and
   store the non-persistent data only in a second contiguous region of the allocated memory, the second contiguous region to follow the first contiguous region.

24. The one or more non-transitory computer-readable storage media of claim 23, wherein:
   the computer system includes a main memory and a GPU memory;
   the allocated memory is to be included in the GPU memory; and
   the allocated memory is to be mapped into a shared memory space with the main memory.

25. The one or more non-transitory computer-readable storage media of claim 23, wherein:
   the allocated memory is to be used as a memory heap by a computer program to perform the two or more processor instructions; and
   the computer program includes a runtime component that is to manage an assignment of variables to memory locations within the memory heap.

26. The one or more non-transitory computer-readable storage media of claim 25, wherein:
   the computer program is to be provided with a base address of the memory heap; and
   the variables are to be addressed using an offset relative to the base address.

27. The one or more non-transitory computer-readable storage media of claim 22, wherein the executable instructions further include instructions that, if executed by the one or more processors, cause the computer system to at least identify the persistent data by:
   identifying a set of inputs of a computer program to perform the two or more processor instructions; and
   identifying a set of outputs of the computer program.

28. The one or more non-transitory computer-readable storage media of claim 27, wherein the instructions to identify the persistent data further include instructions that, if executed by the one or more processors, cause the computer system to at least identify the persistent data by:
   identifying a set of intermediate data to be used by the computer program; and
   allocating memory to store the set of intermediate data that is not contiguous with the persistent data.

29. The one or more non-transitory computer-readable storage media of claim 22, wherein the executable instructions further include instructions that, if executed by the one or more processors, cause the computer system to at least:
   generate a graph representing dependencies of data to be used by a computer program to perform the two or more processor instructions, the graph usable to identify program inputs and program outputs; and
   identify the persistent data to include the program inputs and the program outputs.

30. The one or more non-transitory computer-readable storage media of claim 29, wherein:
   the graph is to be represented as a tree structure;
   the program inputs are to be represented by leaf nodes of the tree structure; and
   the program outputs are to be represented by a root node of the tree structure.

* * * * *